(12) United States Patent
Suominen

(10) Patent No.: US 6,904,405 B2
(45) Date of Patent: Jun. 7, 2005

(54) MESSAGE RECOGNITION USING SHARED LANGUAGE MODEL

(76) Inventor: Edwin A. Suominen, 3355 E. Jump Off Joe Rd., Valley, WA (US) 99181

( * ) Notice: Subject to any disclaimer, the term of this patent is extended or adjusted under 35 U.S.C. 154(b) by 460 days.

(21) Appl. No.: 10/061,052

(22) Filed: Jan. 28, 2002

(65) Prior Publication Data

US 2003/0055655 A1 Mar. 20, 2003

Related U.S. Application Data

(63) Continuation of application No. 09/616,157, filed on Jul. 14, 2000, now abandoned.
(60) Provisional application No. 60/144,481, filed on Jul. 17, 1999.

(51) Int. Cl.[7] .......................... G10L 15/26; G10L 21/00
(52) U.S. Cl. .................................... 704/235; 704/270
(58) Field of Search ............................... 704/231, 235, 704/254, 257, 260, 270

(56) References Cited

U.S. PATENT DOCUMENTS

| | | | |
|---|---|---|---|
| 4,969,180 A | 11/1990 | Watterson et al. ............ 379/58 |
| 5,049,862 A | 9/1991 | Dao et al. .................... 340/706 |
| 5,150,424 A | 9/1992 | Aguro et al. ................. 382/13 |
| 5,349,139 A | 9/1994 | Verrier et al. ................. 178/19 |
| 5,425,129 A | 6/1995 | Garman et al. ............ 395/2.65 |
| 5,434,777 A | 7/1995 | Luciw ................... 364/419.13 |
| 5,467,102 A | 11/1995 | Kuno et al. ..................... 345/1 |
| 5,502,774 A | * 3/1996 | Bellegarda et al. ......... 704/231 |
| 5,546,538 A | 8/1996 | Cobbley et al. ....... 395/200.01 |
| 5,546,565 A | 8/1996 | Suzuki ....................... 395/500 |
| 5,574,804 A | 11/1996 | Olschafskie et al. ........ 382/313 |
| 5,581,783 A | 12/1996 | Ohashi ....................... 395/825 |
| 5,587,559 A | 12/1996 | Fleck et al. .................... 178/18 |
| 5,594,640 A | 1/1997 | Capps et al. ................. 395/794 |
| 5,621,809 A | * 4/1997 | Bellegarda et al. ......... 704/251 |
| 5,666,438 A | 9/1997 | Beernink et al. ............ 382/189 |
| 5,682,439 A | 10/1997 | Beernink et al. ............ 382/187 |
| 5,694,150 A | 12/1997 | Sigona et al. ................ 345/145 |
| 5,740,364 A | 4/1998 | Drerup ................... 395/200.09 |
| 5,787,455 A | 7/1998 | Seybold ....................... 711/100 |

(Continued)

FOREIGN PATENT DOCUMENTS

WO    WO01/82127    11/2001    ........... G06F/17/28

OTHER PUBLICATIONS

Snyder et al ("Low–power software for low–power people", Low Power Electronics, Digest of Technical Papers., IEEE Symposium Oct. 1994).*

Hunsinger et al ("A speech understanding module for a multimodal mathematical formula editor", Acoustics, Speech, and Sign Processing, Jun. 2000).*

(Continued)

*Primary Examiner*—Richemond Dorvil
*Assistant Examiner*—Angela A. Armstrong
(74) *Attorney, Agent, or Firm*—Edwin A. Suominen

(57) ABSTRACT

Certain disclosed methods and systems perform multiple different types of message recognition using a shared language model. Message recognition of a first type is performed responsive to a first type of message input (e.g., speech), to provide text data in accordance with both the shared language model and a first model specific to the first type of message recognition (e.g., an acoustic model). Message recognition of a second type is performed responsive to a second type of message input (e.g., handwriting), to provide text data in accordance with both the shared language model and a second model specific to the second type of message recognition (e.g., a model that determines basic units of handwriting conveyed by freehand input). Accuracy of both such message recognizers can be improved by user correction of misrecognition by either one of them. Numerous other methods and systems are also disclosed.

17 Claims, 17 Drawing Sheets

U.S. PATENT DOCUMENTS

| | | | | |
|---|---|---|---|---|
| 5,818,949 | A | | 10/1998 | Deremer et al. ............ 381/172 |
| 5,828,999 | A | | 10/1998 | Bellegarda et al. ......... 704/240 |
| 5,839,106 | A | | 11/1998 | Bellegarda .................. 704/257 |
| 5,850,058 | A | | 12/1998 | Tano et al. .............. 178/18.01 |
| 5,855,000 | A | * | 12/1998 | Waibel et al. .............. 704/235 |
| 5,870,492 | A | | 2/1999 | Shimizu et al. ............. 382/187 |
| 5,870,706 | A | | 2/1999 | Alshawi ..................... 704/255 |
| 5,899,976 | A | | 5/1999 | Rozak ........................ 704/270 |
| 5,917,942 | A | | 6/1999 | Ehsani et al. ............... 382/189 |
| 5,920,837 | A | | 7/1999 | Gould et al. ................ 704/251 |
| 5,937,422 | A | | 8/1999 | Nelson et al. .............. 707/531 |
| 5,946,499 | A | | 8/1999 | Saunders .................... 395/893 |
| 5,991,726 | A | | 11/1999 | Immarco et al. ............ 704/270 |
| 6,154,722 | A | | 11/2000 | Bellegarda .................. 704/257 |
| 6,167,376 | A | * | 12/2000 | Ditzik ........................ 704/235 |
| 6,285,785 | B1 | | 9/2001 | Bellegarda et al. ......... 382/187 |
| 6,292,857 | B1 | * | 9/2001 | Sidoroff et al. ............. 704/231 |
| 6,340,967 | B1 | | 1/2002 | Maxted ...................... 345/179 |
| 6,363,348 | B1 | | 3/2002 | Besling et al. ........... 704/270.1 |
| 6,393,395 | B1 | | 5/2002 | Guha et al. ................. 704/232 |
| 6,415,256 | B1 | * | 7/2002 | Ditzik ........................ 704/231 |
| 6,438,523 | B1 | * | 8/2002 | Oberteuffer et al. ........ 704/270 |
| 6,446,041 | B1 | * | 9/2002 | Reynar et al. .............. 704/280 |
| 6,456,975 | B1 | | 9/2002 | Chang .................... 704/270.1 |
| 6,513,005 | B1 | * | 1/2003 | Qin et al. .................... 704/254 |
| 2002/0075300 | A1 | | 6/2002 | Tang et al. ................. 345/744 |
| 2002/0178008 | A1 | | 11/2002 | Reynar ....................... 704/272 |
| 2003/0189603 | A1 | | 10/2003 | Goyal et al. ................ 345/863 |
| 2003/0212961 | A1 | | 11/2003 | Soin et al. .................. 715/530 |
| 2003/0216913 | A1 | | 11/2003 | Keely et al. ................ 704/235 |
| 2003/0233237 | A1 | | 12/2003 | Garside et al. ............. 704/270 |

OTHER PUBLICATIONS

Lin et al ("A recursively structured solution for handwritng and speech recognition", Multimedia Signal Processing, IEEE First Workshop on, Jun. 1997).*

Vo et al ("Building an application framework for speech and pen input integration in multimodal learning interface", Acoustics, Speech, and Signal Processing, ICASSP–96. Conference Proceedings, May 1996).*

Bellegarda, J. et al. Research Report RC 17312, "Automatic Recognition of Integrated Speech and Handwriting Information," IBM Research Division, dated Aug. 1991.

Falcigno, K. IBM T.J. Watson Research Center Library. Email of Jun. 29, 2004 regarding Research Report RC 17312.

Feng, W. "Using Handwriting and Gesture Recognition to Correct Speech Recognition Errors," from Proc. Of the $10^{th}$ Int'l Conf. On Adv. Sci. & Tech., pp. 105–112, dated Mar. 1994. (Some images blank in available copy.).

Meyer, A. "Pen Computing: A Technology Overview and a Vision", SIGCHI Bulletin, vol. 27, No. 3, dated Jul. 1995.

Starner, T. et al. "On–Line Cursive Handwriting Recognition Using Speech Recognition Methods," in International Conference on Acoustics, Speech and Signal Processing, vol. 5, pp. 125–128, 1994.

Suhm, B. et al. "Model–based and Empirical Evaluation of multimodel Interactive Error Correction," CHI '99 Conference Proceedings, pp. 584–591, dated May 1999.

A. El–Yacoubi, et al., "An HMM–Based Approach for Off–Line Unconstrained Handwritten Word Modeling and Recognition," IEEE Transactions on Pattern Analysis and Machine Intelligence, vol. 21, No. 8, Aug. 1999.

* cited by examiner

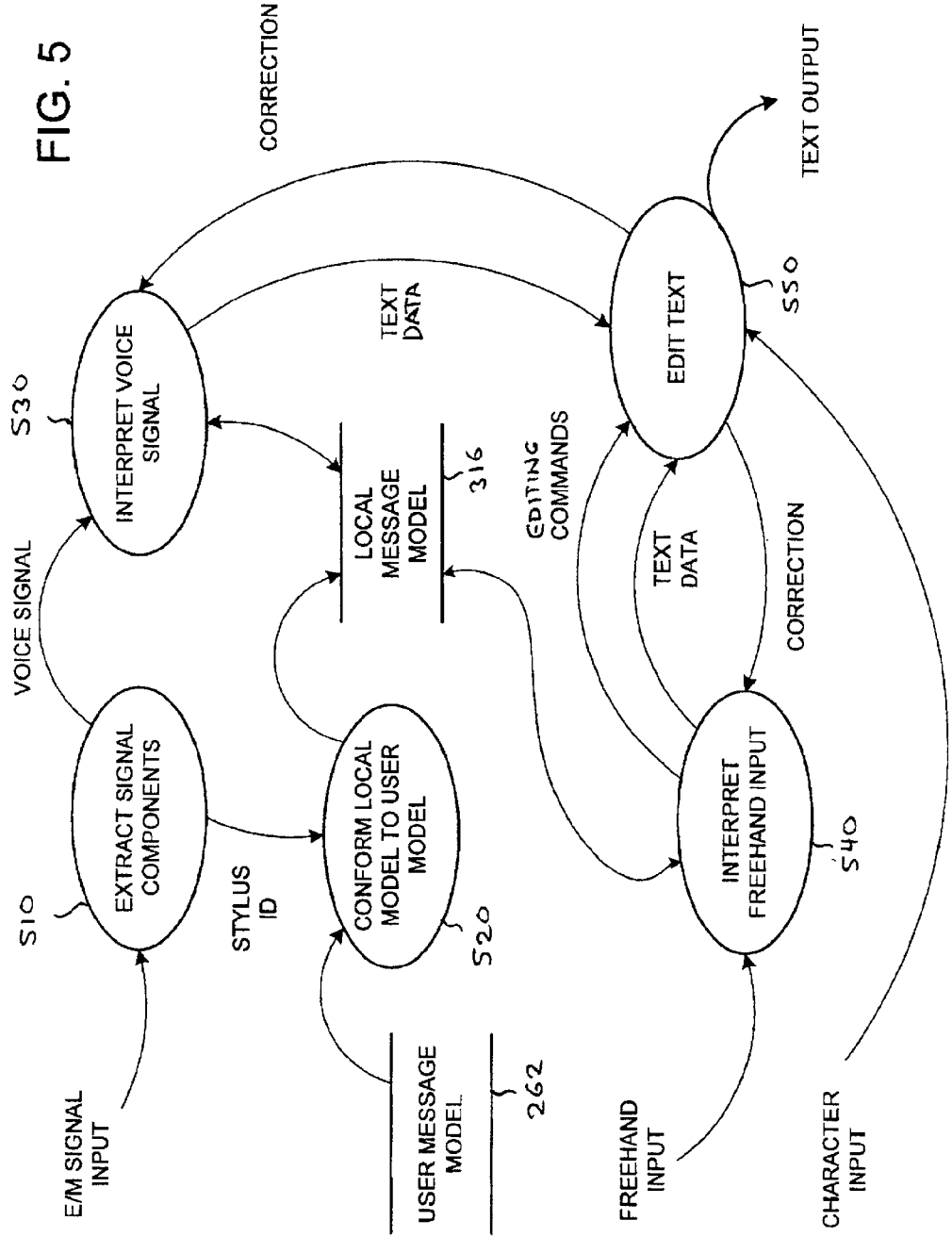

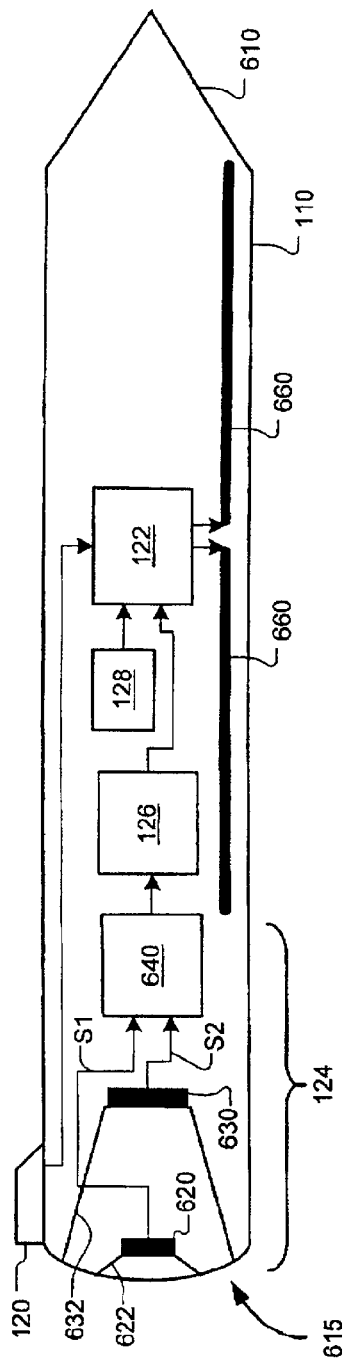
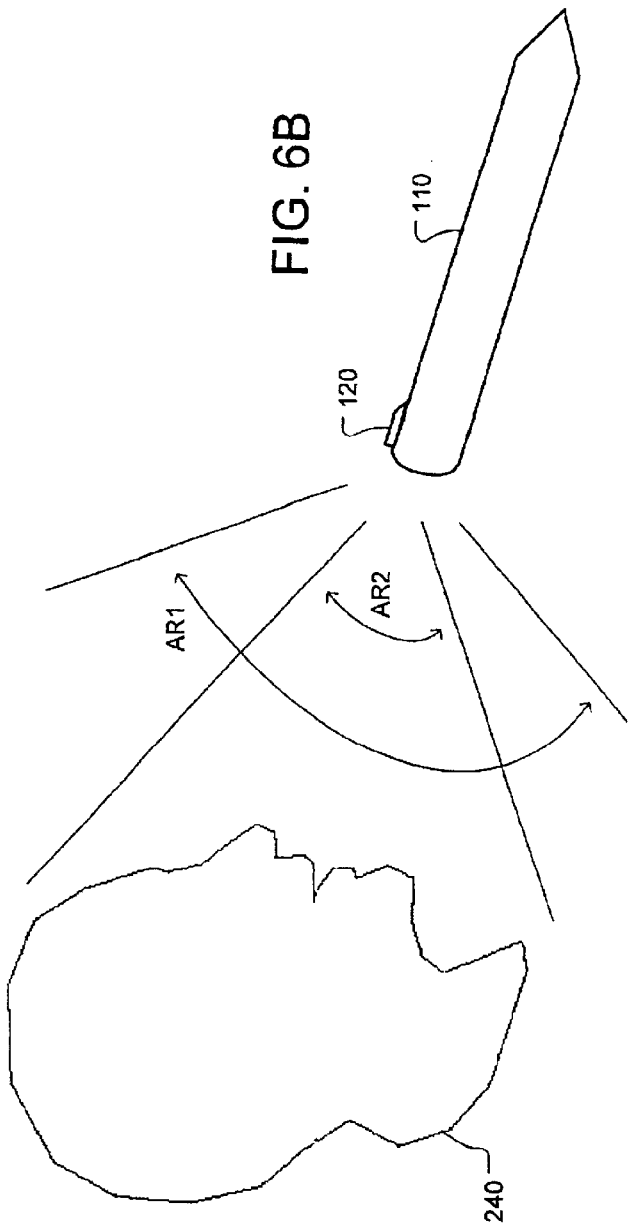

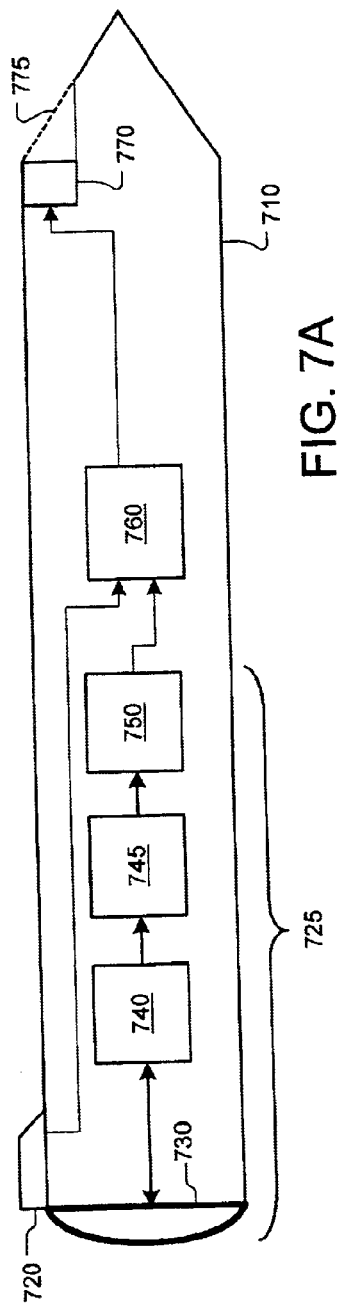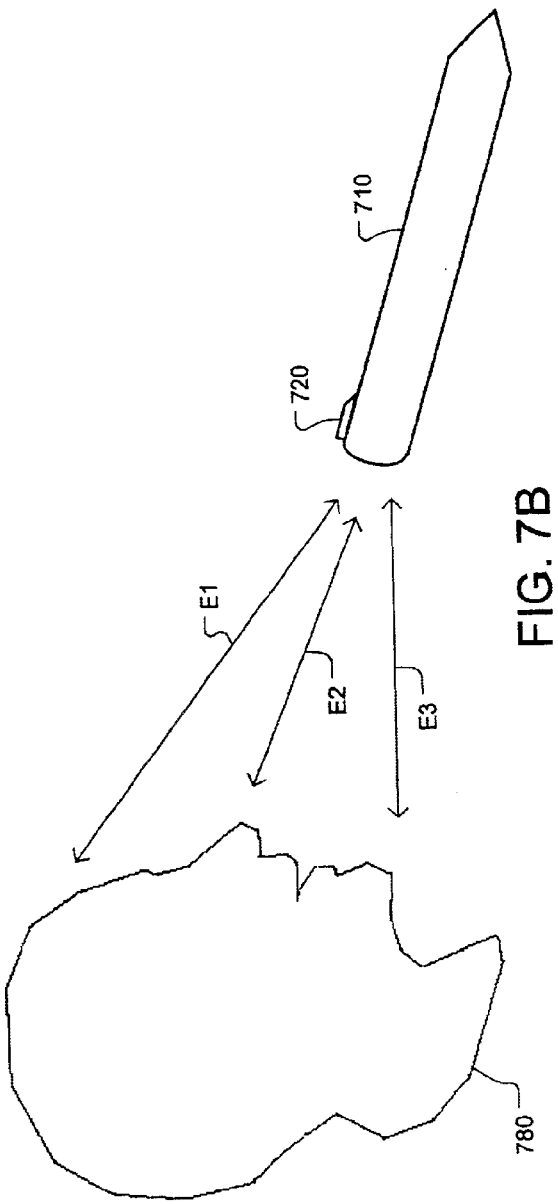
FIG. 7A
FIG. 7B

| |
|---|
| $W_0$ HEADER - "UNCLE", RECORDS = ... |
|   $PR(W_0 \mid V) = ...$ |
|     $W_{0A}$ - AUNT - $PR(W_0W_{0A} \mid V) = ...$ |
|     $W_{0B}$ - NEPHEW - $PR(W_0W_{0B} \mid V) = ...$ |
|     $W_{0C}$ - RELATIVE - $PR(W_0W_{0C} \mid V) = ...$ |
|     $W_{0D}$ - BROTHER - $PR(W_0W_{0D} \mid V) = ...$ |
|     ⋮ |
| $W_1$ HEADER - "COORS", RECORDS = ... |
|   $PR(W_1 \mid V) = ...$ |
|     $W_{1A}$ - BAR - $PR(W_1W_{1A} \mid V) = ...$ |
|     $W_{1B}$ - BEER - $PR(W_1W_{1B} \mid V) = ...$ |
|     $W_{1C}$ - CAN - $PR(W_1W_{1C} \mid V) = ...$ |
|     $W_{1D}$ - BREWING - $PR(W_1W_{1D} \mid V) = ...$ |
|     ⋮ |
| $W_2$ HEADER - "BEACH", RECORDS = ... |
|   $PR(W_2 \mid V) = ...$ |
|     $W_{2A}$ - WATER - $PR(W_2W_{2A} \mid V) = ...$ |
|     $W_{2B}$ - SAND - $PR(W_2W_{2B} \mid V) = ...$ |
|     $W_{2C}$ - OCEAN - $PR(W_2W_{2C} \mid V) = ...$ |
|     $W_{2D}$ - PACIFIC - $PR(W_2W_{2D} \mid V) = ...$ |

FIG. 12

1200

MESSAGE RECOGNITION USING SHARED LANGUAGE MODEL

This application is a continuation of U.S. patent application Ser. No. 09/616,157, filed Jul. 14, 2000, now abandoned, which claims the benefit of U.S. Provisional Patent Application No. 60/144,481, filed Jul. 17, 1999. Both prior applications are incorporated herein by reference.

BACKGROUND OF THE INVENTION

Conventional computer workstations use a "desktop" interface to organize information on a single display screen. Users of such workstations may work with multiple documents on the desktop interface. However, many users find it more desirable to organize multiple documents on a work surface than to focus attention to multiple windows on a fixed display screen. A physical work surface is usually much larger than the screen display, and multiple documents may be placed on the surface for quick access and review. For many users, it is more natural and convenient to look for a desired document by visual inspection in a physical workspace than to click on one of a number of windows on a display screen. Because it is desirable to shift positions throughout a long workday, many users also prefer to physically pick up a document and review it in a reclining position instead of remaining in a fixed, upright seated position to review the document on a fixed display screen.

In an article entitled "The Computer for the 21st Century," which appeared in the September 1991 issue of *Scientific American*, Mark Weiser has proposed "electronic pads" that may be spread around on a desk like conventional paper documents. These pads are intended to be "scrap computers", analogous to scrap paper and having no individualized identity or importance. The pads can be picked up and used anywhere in the work environment to display an electronic document and receive freehand input with a stylus.

An article in the Sep. 17, 1993 issue of *Science* included a further description of Weiser's ideas. In the article, electronic pads are characterized as thin note pads with a flat screen on top that a user could scribble on. The pads are intended to be as easy to use as paper. Instead of constantly opening and closing applications in the on-screen windows of a single desktop machine, a user could stack the pads around an office like paper and have all of them in use for various tasks at the same time.

The need has long been felt to generate text data (e.g., character codes in a word processor) by voice input, and to integrate voice input with pen-based computers. An article headlined "Pen and Voice Unite" in the October 1993 issue of *Byte Magazine*, for example, describes a system for responding to alternating spoken and written input. In the system described, the use of pen and voice alternates as the user either speaks or writes to the system. The article states that using a pen to correct misrecognitions as they occur could make an otherwise tedious dictation system acceptable. According to the article, misrecognized words could be simply crossed out. The article suggests, however, that a system in which the use of pen and voice alternates as the user either speaks or writes to the system is less interesting than possibilities that could arise from simultaneous speech and writing.

The effectiveness and convenience of generating text data by voice input is directly proportional to the accuracy of the speech recognizer. Frequent misrecognitions make generation of text data tedious and slow. To minimize the frequency of misrecognitions, it is desirable to provide voice input of relatively high acoustic quality to the speech recognizer. A signal with high acoustic quality has relatively consistent reverberation and amplitude, and a high signal-to-noise ratio. Such quality is conventionally obtained by receiving voice input via a headset microphone. By being mounted on a headset, a microphone may be mounted at a close, fixed proximity to the mouth of a person dictating voice input and thus receive voice input of relatively high acoustic quality.

Head mounted headsets have long been viewed with disfavor for use with speech recognition systems, however. In a 1993 article entitled "From Desktop Audio to Mobile Access: Opportunities for Voice in Computing," Christopher Schmandt of MIT's Media Laboratory concludes that "obtaining high-quality speech recognition without encumbering the user with head mounted microphones is an open challenge which must be met before recognition will be accepted for widespread use." In the Nov. 7, 1994 issue of *Government Computer News*, an IBM marketing executive in charge of IBM speech and pen products is quoted as saying that, inter alia, a way must be found to eliminate head-mounted microphones before natural-language computers become pervasive. The executive is further quoted as saying that the headset is one of the biggest inhibitors to the acceptance of voice input.

Being tethered to a headset is especially inconvenient when the user needs to frequently walk away from the computer. Even a cordless headset can be inconvenient. Users may feel self-conscious about wearing such a headset while performing tasks away from the computer.

The long felt need for a system incorporating speech recognition capability with pen-based computers has remained largely unfulfilled. Such a system presents conflicting requirements for high acoustic quality and freedom of movement. Pen-based computers are often used in collaborative environments having high ambient noise and extraneous speech. In such environments, the user may be an engaging in dialogue and gesturing in addition to dictation. Although a headset-mounted microphone would maintain acoustic quality in such situations, the headset is inconsistent with the freedom of movement desired by users of pen-based computers.

It has long been known to incorporate a microphone into a stylus for the acquisition of high-quality speech in a pen-based computer system. For example, the June 1992 edition of IBM's *Technical Disclosure Bulletin* discloses such a system, stating that speech is a way of getting information into a computer, either for controlling the computer or for storing and/or transmitting the speech in digitized form. However, the *Bulletin* states that such a system is not intended for applications where speech and pen input are required simultaneously or in rapid alteration.

IBM's European patent application EP 622724, published in 1994, discloses a microphone in a stylus for providing speech data to a pen-based computer system, which can be recognized by suitable voice recognition programs, to produce operational data and control information to the application programs running in the computer system. See, for example, column 18, lines 35–40 of EP 622724. Speech data output from the microphone and received at the disclosed pen-based computer system can be converted into operational data and control information by a suitable voice recognition program in the system.

To provide an example of a "suitable voice recognition program," the EP 622724 application refers to U.S. patent application Ser. No. 07/968,097, which matured into U.S.

Pat. No. 5,425,129 to Garman. At column 1, lines 54–56, the '129 patent states the object of providing a speech recognition system with word spotting capability, which allows the detection of indicated words or phrases in the presence of unrelated phonetic data.

Due to the shortcomings of available references such as the aforementioned June 1992 IBM *Technical Disclosure Bulletin*, EP 622724 European application, and 07/968,097 U.S. application, the need remains to integrate high-quality voice input for dictation with pen-based computers. This need is especially unfulfilled for a system that includes voice dictation capability with a number of electronic pads. Such a system would need to maintain acoustic quality while providing voice input to a desired one of the pads, which are spread out on a work surface, possibly in a noisy collaborative environment, at varying distances from the source of voice input.

The need also remains for a speech recognizer that may be automatically activated when voice input is desired. U.S. Pat. No. 5,857,172 to Rozak, for example, identifies a difficulty encountered with conventional speech recognizers in that such speech recognizers are either always listening and processing input or not listening. When such a speech recognizer is active and listening, all audio input is processed, even undesired audio input in the form of background noise and inadvertent comments by a speaker. As discussed above, such undesired audio input may be expected to be especially problematic in collaborative environments where pen-based computers are often used. The '172 patent discloses a manual activation system having a designated hot region on a video display for activating the speech recognizer. Using this manual system, the user activates the speech recognizer by positioning a cursor within the hot region. It would be desirable however, for a speech recognizer to be automatically activated without the need for a specific selection action by the user.

Speech recognition may be viewed as one possible subset of message recognition. As defined in Merriam-Webster's *WWWebster Dictionary* (Internet edition), a message is "a communication in writing, in speech, or by signals." U.S. Pat. No. 5,502,774, issued Mar. 26, 1996 to Bellegarda discloses a "message recognition system" using both speech and handwriting as complementary sources of information. Speech recognizers and handwriting recognizers are both examples of message recognizers.

A need remains for message recognition with high accuracy. Misrecognitions by conventional message recognizers, when frequent, make generation of text data tedious and slow. Conventional language, acoustic, and handwriting models respond to user training (e.g., corrections of misrecognized words) to adapt and improve recognition with continued use.

In conventional message recognition systems, user training is tied to a specific computer system (e.g., hardware and software). Such training adapts language, acoustic, and/or handwriting models that reside in data storage of the specific computer system. The adapted models may be manually transferred to a separate computer system, for example, by copying files to a magnetic storage medium. The inconvenience of such a manual operation limits the portability of models in a conventional speech recognition system. Consequently, a user of a second computer system is often forced to duplicate training that was performed on a first computer system. In addition, rapid obsolescence of computer hardware and software often renders adapts language, acoustic, and/or handwriting models unusable after the user has invested a significant amount of time to adapt those models.

Conventionally, user training is also tied to a specific type of message recognizer. Correction of misrecognized words typically improves only the accuracy of the particular type of message recognizer being corrected. U.S. Pat. No. 5,502, 774 to Bellegarda discloses a multi-source message recognizer that includes both a speech recognizer and a handwriting recognizer. The '774 patent briefly states, at column 4, lines 54–58, that the training of respective source parameters for speech and handwriting recognizers may be done globally using weighted sum formulae of likelihood scores with weighted coefficients. However, the need remains for a multi-source message recognizer that can apply user correction to appropriately perform training for multiple types of recognition, by applying the correction of a message misrecognition only to those models employed in the type of message recognition to which the training is directly relevant.

Conventional message recognition systems include a language model and a type-specific model (e.g., acoustic or handwriting). As discussed in U.S. Pat. No. 5,839,106, issued Nov. 17, 1998 to Bellegarda, conventional language models rely upon the classic N-gram paradigm to define the probability of occurrence, within a spoken vocabulary, of all possible sequences of N words. Given a language model consisting of a set of a priori N-gram probabilities, a conventional speech recognition system can define a "most likely" linguistic output message based on acoustic input signal. As the '106 patent points out, however, the N-gram paradigm does not contemplate word meaning, and limits on available processing and memory resources preclude the use of models in which N is made large enough to incorporate global language constraints. Accordingly, models based purely on the N-gram paradigm can utilize only limited information about the context of words to enhance recognition accuracy.

Semantic approaches to language modeling have been disclosed. Generally speaking, such techniques attempt to capture meaningful word associations within a more global language context. For example, U.S. Pat. No. 5,828,999, issued Oct. 27, 1998 to Bellegarda et al. discloses a large-span semantic language model which maps words from a vocabulary into a vector space. After the words are mapped into the space, vectors representing the words are clustered into a set of clusters, where each cluster represents a semantic event. After clustering the vectors, a first probability that a first word will occur (given a history of prior words) is computed. The probability is computed by calculating a second probability that the vector representing the first word belongs to each of the clusters; calculating a third probability of each cluster occurring in a history of prior words; and weighting the second probability by the third probability.

The '106 patent discloses a hybrid language model that is developed using an integrated paradigm in which latent semantic analysis is combined with, and subordinated to, a conventional N-gram paradigm. The integrated paradigm provides an estimate of the likelihood that a word, chosen from an underlying vocabulary, will occur given a prevailing contextual history.

A prevailing contextual history may be a useful guide for performing general semantic analysis based on a user's general writing style. However, a specific context of a particular document may be determined only after enough words have been generated in that document to create a specific contextual history for the document. In addition, the characterization of a contextual history by a machine may itself be inaccurate. For effective semantic analysis, the need remains for accurate and early identification of context.

BRIEF DESCRIPTION OF THE DRAWING

Embodiments of the present invention are described below with reference to the drawing, wherein like designations denote like elements, and:

FIG. 5 is a data flow diagram of the operation of the domain controller of FIG. 3A in cooperation with the stylus of FIG. 4;

FIG. 6A is a functional and simplified schematic block diagram of a stylus that includes an activation circuit having an infrared radiation sensor responsive to infrared field radiation according to various aspects of the present invention;

FIG. 6B is a simplified pictorial view illustrating operation of the activation circuit in the stylus of FIG. 6A;

FIG. 7A is a functional and simplified schematic block diagram of a stylus that includes an activation circuit having an acoustic radiation sensor and ultrasonic transmitter according to various aspects of the present invention;

FIG. 7B is a simplified pictorial view illustrating operation of the activation circuit in the stylus of FIG. 7A;

FIG. 8, including

FIG. 12 illustrates a partial example of a data structure tabulating probabilities computed in the method of FIG. 10.

DESCRIPTION OF PREFERRED EXEMPLARY EMBODIMENTS

Figure 1A:
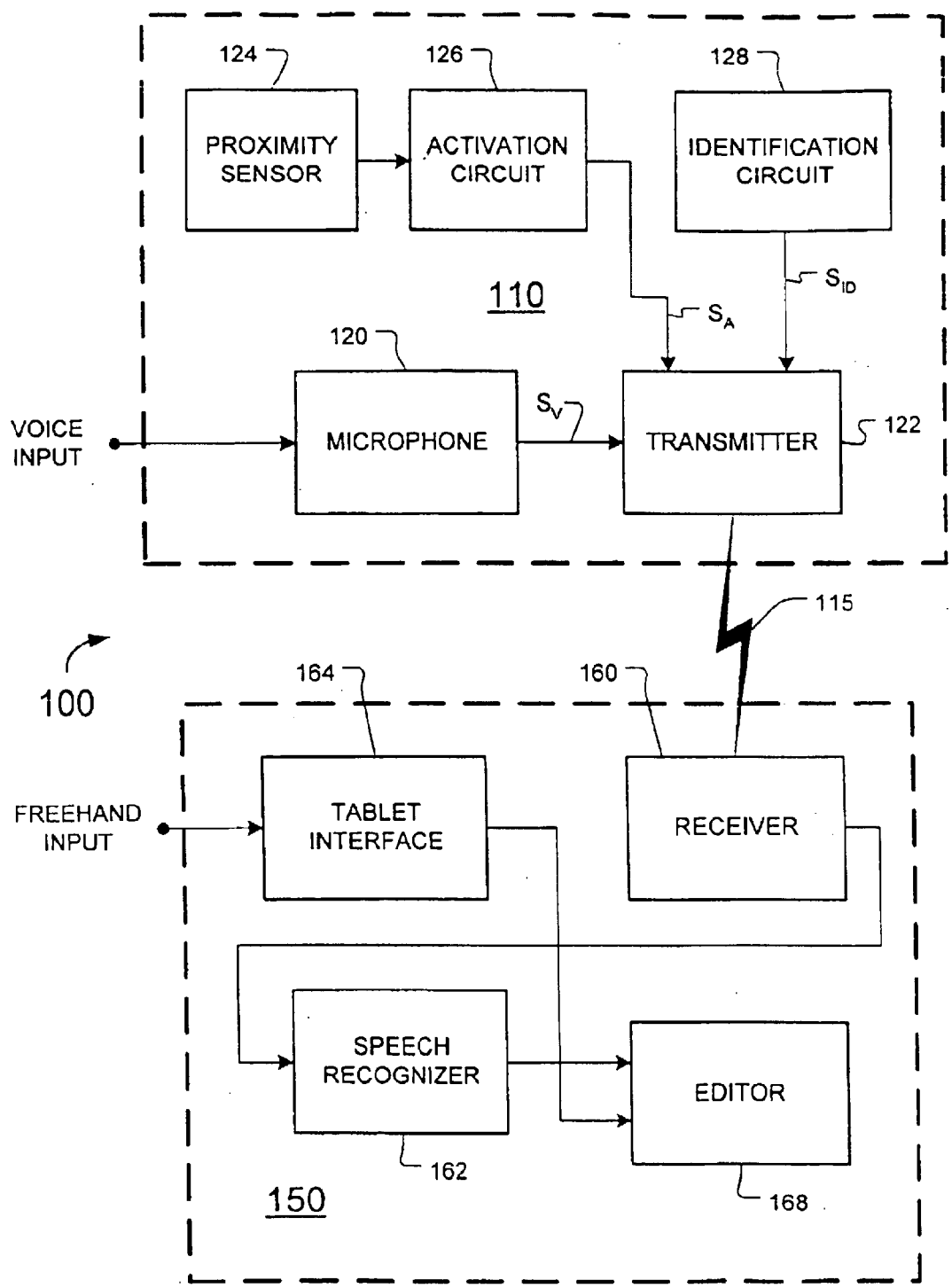
FIGS. 1A and 1B are, respectively, a functional block diagram and simplified pictorial view of a single-tablet system responsive to freehand input and voice input, according to various aspects of the present invention.

A text processing system according to various aspects of the present invention may be responsive to both voice input and freehand input to generate and edit text data. Text data is any indicia of text that may be stored and conveyed numerically. For example, text data may be numerical codes used in a computer to represent individual units (e.g., characters, words, kanji) of text. Voice input may be used primarily to generate text data, while freehand input may be used primarily to edit text data generated by voice input. For example, system 100 of FIG. 1 (including FIGS. 1A and 1B) suitably includes a stylus 110 responsive to voice input and a tablet 150 responsive to freehand input, coupled together via a communications link 115.

A tablet according to various aspects of the present invention includes any suitable hardware and/or software for performing functions of, inter alia, a speech recognizer and an editor. Tablet 150, for example, may include a conventional CPU and memory (not shown) having indicia of suitable software instructions for the CPU to implement tablet interface 164, speech recognizer 162, and editor 168. Tablet 150 may further include suitable conventional hardware (e.g., "glue logic," display driving circuitry, battery power supply, etc.) and/or software (e.g., operating system, handwriting recognition engine, etc.).

Tablet 150 may be an "electronic book" type of portable computer having a tablet surface and a display integrated into the tablet surface. Such a computer may include hardware and software of the type disclosed in U.S. Pat. No. 5,602,516, issued Sep. 1, 1998 to Shwarts et at., and U.S. Pat. No. 5,903,668, issued May 11, 1999 to Beemink. The detailed description portion (including referenced drawing figures) of each of these two aforementioned patents is incorporated herein by reference. Further, the detailed description portion (including referenced drawing figures) of any U.S. patent or U.S. patent application incorporated by reference into either of these two aforementioned patents is also specifically incorporated herein by reference.

Figure 2:
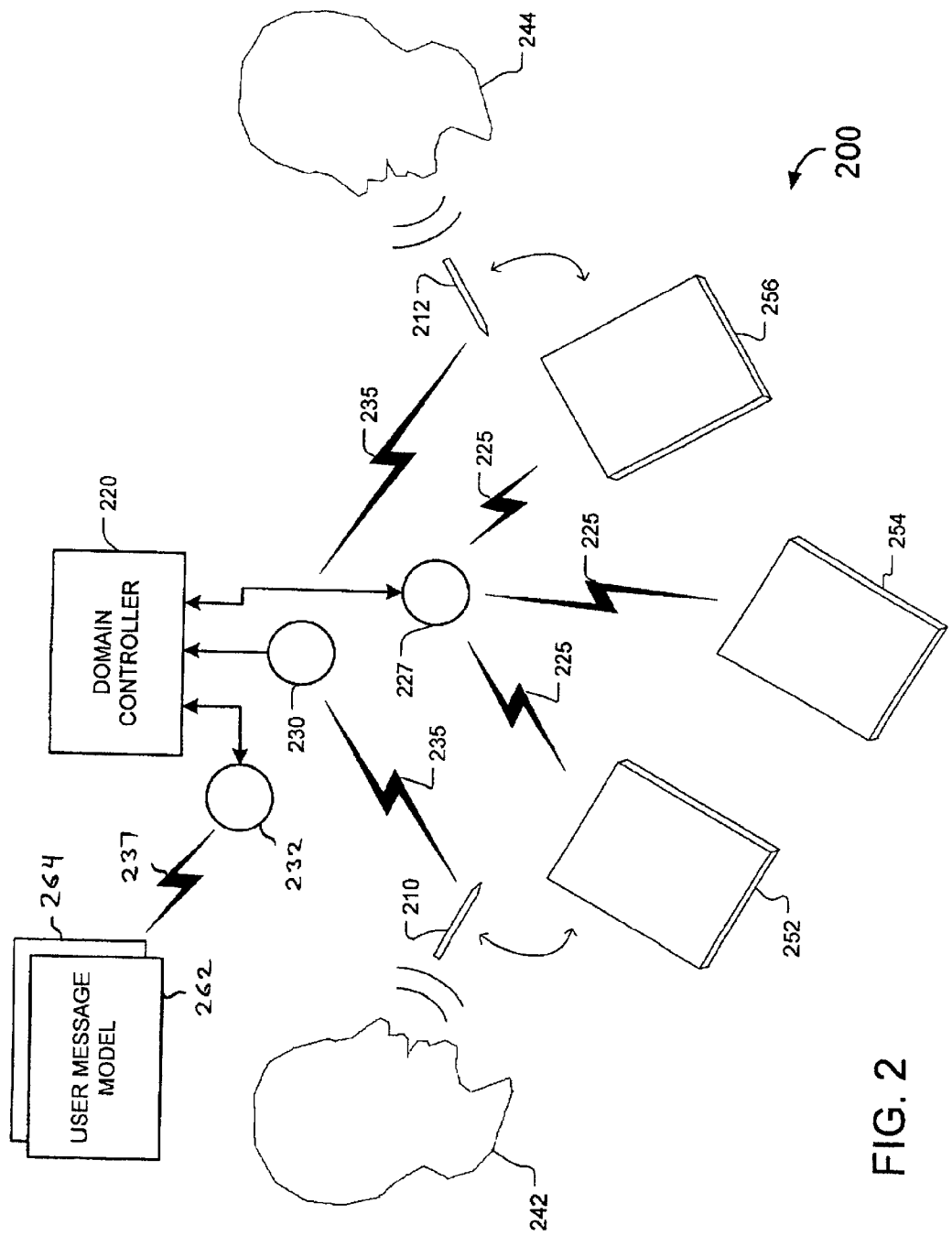
FIG. 2 is a combination block diagram and simplified pictorial view of a multiple-tablet system responsive to freehand input and voice input, according to various aspects of the present invention.

Functional blocks implemented by hardware and/or software in tablet 150 include: tablet interface 164 for receiving freehand input communicated via pointer 610 of stylus 110; receiver 160 for receiving (indirectly) voice input communicated via microphone 120 of stylus 110; speech recognizer 162 for generating text data responsive to the voice input; and editor 168. In FIG. 2 and also in FIGS. 3A and 3B (discussed below), interconnection between functional blocks is depicted by single lines. Such lines represent transfer of data by any suitable hardware or software interconnection, including, for example, the transfer of memory contents between software objects instantiated in a single processing environment.

Microphone 120 couples voice input from stylus 110 to speech recognizer 162 via transmitter 122 and receiver 160. Transmitter 122 is coupled to receiver 160 via communications link 115. Speech recognizer 162 generates text data responsive to voice input from user 240 and provides the text data to editor 168. Tablet interface 164 interprets editing commands responsive to freehand input and provides indicia of the editing commands to editor 168. Editor 168 performs any modifications to the text data that are suitably specified by the editing commands. Speech recognizer 162, tablet interface 164, and editor 168 are described in greater detail below.

According to various aspects of the present invention, a communications link may employ any suitable medium, modulation format, and/or communications protocol to convey information from transmitter in a stylus to a receiver in, for example, a table. A communications link may use a wired (i.e., physical) connection, or a wireless connection through modulated field radiation. Field radiation includes acoustic radiation and electromagnetic radiation in the radio, infrared, or visible light spectrum. For example, communications link 115 uses modulated radio transmission to convey information from transmitter 122 to receiver 160.

A transmitter according to various aspects of the present invention includes any suitable hardware and/or software for transmitting voice input via a communications link 115. When a simple wired connection is utilized for a communications link, no transmitter may be needed. When a wireless connection is utilized, a transmitter may include appropriate conversion, modulation, and/or transmission circuitry. For example, transmitter 122 in stylus 110 includes a conventional analog-to-digital converter for converting voice input into digital samples, and a conventional modulator/transmitter for converting the digital samples into an analog signal having a desired modulation format (e.g., FSK, QPSK). A transmitter may be coupled to a radiating device for converting the analog signal into a desired form of field radiation (e.g., an RF signal in the 1–5 GHz range). For example, transmitter 122 couples an RF signal to a conventional dipole antenna having elements 660, which are oriented parallel to a longitudinal axis of stylus 110. As a further example, infrared transmitter 760 in stylus 710 couples digital modulation to a conventional solid state infrared emitter 770. Emitter 770 produces modulated infrared radiation, which passes out of stylus 710 through transparent aperture 775.

A receiver according to various aspects of the present invention includes any suitable hardware and/or software for receiving information from a transmitter via a communications link. When a simple wired connection is utilized for a communications link, a receiver may consist of a circuit for amplifying and/or filtering the signal from a microphone. When a wireless connection is utilized, a receiver may include appropriate receiving, demodulation, and conversion circuitry, generally complementary to circuitry in a cooperating transmitter. For example, receiver 160 of tablet 150 includes a conventional, receiver/demodulator for converting an analog signal transmitted by transmitter 122 and picked up by a suitable sensing device (e.g., an antenna, not shown).

In a variation, a communications link may be of the type disclosed in U.S. Pat. No. 4,969,180 issued Nov. 6, 1990 to Watterson et al., The disclosure found from column 5, line 19 through column 14, line 55 of the aforementioned patent, including drawing figures referenced therein, is incorporated herein by reference. In such a variation, an analog ultrasonic signal is employed in a communications link.

A stylus according to various aspects of the present invention includes any device having a pointer for conveying freehand input to a tablet interface. A pointer may be a portion of one end of a stylus that is suitably narrow for a user to convey freehand input (e.g., gestures, editing commands, and handwriting). Typically, a pointer is a tapered portion toward the distal (ie., downward, in operation) end of a stylus. As may be better understood with reference to FIG. 6A, for example, stylus 110 includes a tapered pointer 610, which a user 240 may manually manipulate on or near surface 152 of tablet 150 to convey freehand input. As may be better understood with reference to FIG. 1A, exemplary stylus 110 further includes: a microphone 120; a proximity sensor 124; an activation circuit 126; an identification circuit 128; a transmitter 122; control circuitry (not shown) such as a programmable logic device and/or a microcontroller; and suitable supporting hardware (e.g., battery power supply).

By permitting alternating speech and pen input using stylus 110, text processing system 100 provides speech recognition with improved accuracy and editing convenience. To generate text by dictation, user 240 moves stylus 110 toward his or her mouth and begins speaking into microphone 120. To edit text, user 240 moves stylus 110 to tablet surface 152 and manually manipulates pointer 610 on surface 152. User 240 need not be tethered to a head-mounted microphone; he or she already has microphone 120 in hand when grasping stylus 110. When positioned near the mouth of user 240, microphone 120 is typically able to receive high quality voice input comparable to that received by a head-mounted microphone.

When employed for generating an editing an electronic document, tablet 150 may be used as an alternative to a paper document and can be expected to be positioned near the head of user 240. When tablet 150 is positioned for comfortable use, for example resting on the thigh portion of a crossed leg of user 240, the distance between tablet surface 152 and the head of user 240 may be only about twice the length of stylus 110. In such a configuration, alternating speech and freehand input using stylus 110 can be expected to be natural and intuitive. User 240 may find it natural and intuitive to move stylus 110 away from tablet surface 152, and toward his or her mouth, while reviewing displayed text and preparing to generate additional text by dictation. No significant change in the orientation of stylus 110 is necessary because microphone 120 typically remains aimed toward the mouth of user 240. User 240 may also find it natural and intuitive to edit the text he or she has generated, or to correct misrecognized dictation, by simply moving stylus 110 toward and onto tablet surface 152 to manipulate pointer 610 on surface 152.

Preferably, microphone 120 is disposed toward the proximal (i.e., upward in operation) end of stylus 110 and is at least somewhat directional to improve quality of voice input when pointed toward the mouth of user 240. When directional, microphone 120 is responsive to sound impinging on stylus 110 from the direction of its proximal end with a greater sensitivity than from its distal end.

A stylus may include a proximity sensor and an activation circuit for activating a speech recognizer when the stylus is proximate a human head. A stylus may also include (alternatively or additionally) an identification circuit for identifying the owner of the stylus, for example to permit selection of an appropriate user message model, as described below. Exemplary stylus 110 further includes: proximity sensor 124; activation circuit 126; and identification circuit 128.

An activation circuit according to various aspects of the present invention includes any circuit housed in a stylus for activating speech recognition when the stylus is situated to receive voice input. Such a circuit may determine that the stylus is situated to receive voice input by sensing one or more conditions. Such conditions include, for example, the amplitude or angle of impingement of sound waves from the voice input and the proximity (i.e., displacement and/or orientation) of the stylus with respect to the head of a user providing the voice input.

An activation circuit may employ any conventional selection or control system to activate speech recognition. In system 100, for example, activation circuit 126 provides a binary activation signal $S_A$ to transmitter 122 while microphone 120 provides transmitter 122 an analog voice signal $S_V$. Transmitter 122 continuously conveys both activation signal $S_A$ and voice signal $S_V$ to receiver 160. Activation signal $S_A$ includes an activation bit that is set to a true state by activation circuit 126 to activate speech recognition.

Receiver 160 may be configured to convey voice signal $S_V$ to speech recognizer 162 only when the activation bit is set to a true state. In a variation, speech recognizer 162 may be configured to generate text responsive to voice input only when the activation bit is in a true state. In another possible variation, activation signal $S_A$ may selectively control the transmission of voice signal $S_V$ by transmitter 122.

An activation circuit that senses angle of impingement of sound waves as a condition for activation may include a plurality (e.g., two) of sound sensors that are responsive to sound impinging on the stylus from a plurality of respective angular ranges. Such a circuit also includes a comparator for comparing the amplitudes of sound from the sound sensors. When the relative amplitude indicates that the voice input is impinging on the stylus from within a predetermined angular range, the comparator makes a positive determination that causes activation of speech recognition.

When such an activation circuit is used, the function of a microphone may be easily incorporated into one of the sound sensors. Consequently, it may not be necessary for a stylus employing such an activation circuit to include a separate microphone. The activation circuit may include circuitry of the type disclosed in U.S. Pat. No. 4,489,442, issued Dec. 18, 1984 to Anderson et al. The disclosure found from column 2, line 42 through column 11, line 29 of this aforementioned patent, including drawing figures referenced therein, is incorporated herein by reference.

Figure 1B:
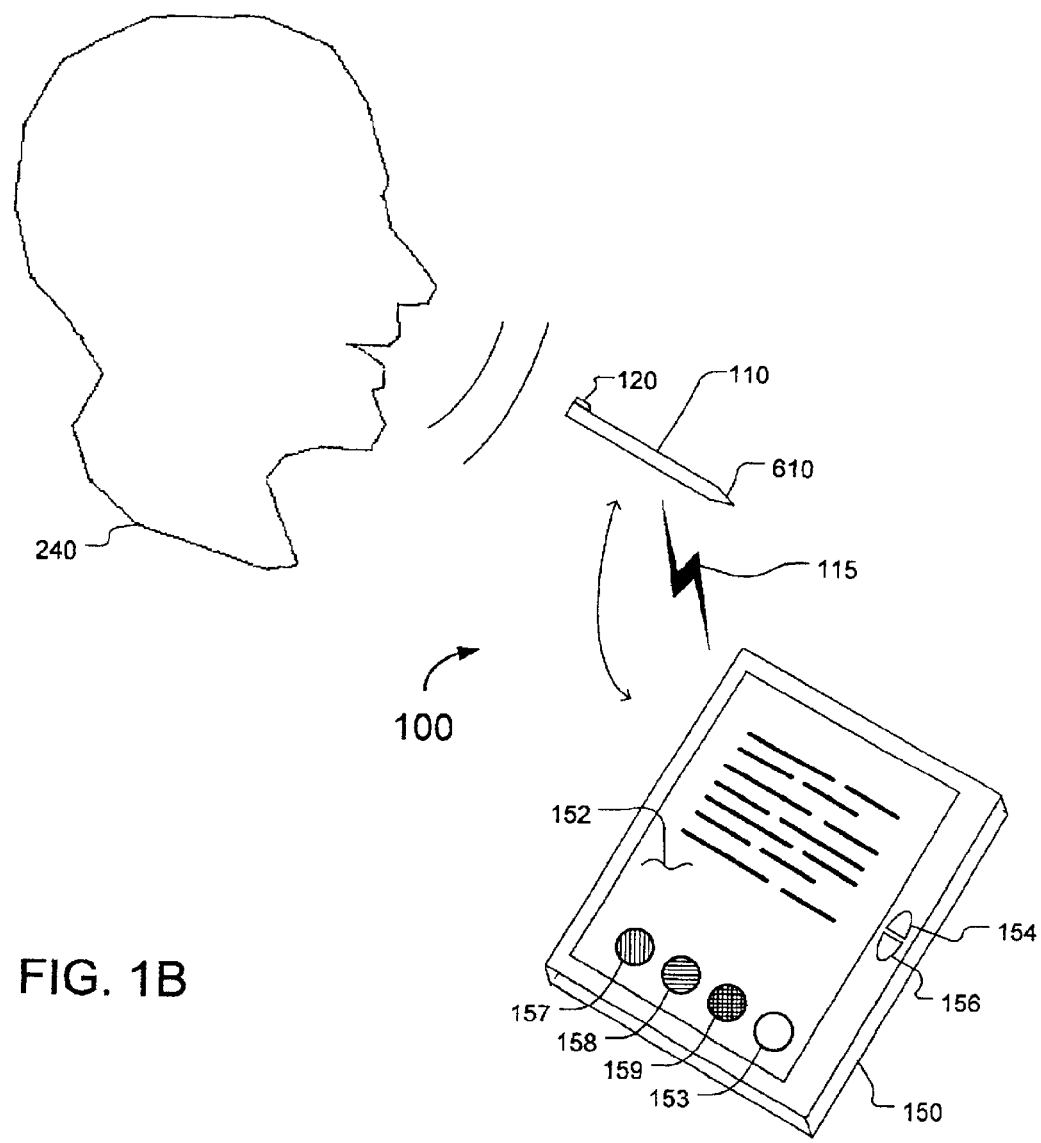

As may be better understood with reference to FIGS. 1A and 6A, activation circuit 126 is a preferred example of an activation circuit that senses proximity of stylus 110 with respect to the head of a user 240 providing voice input. Activation circuit 126 includes a proximity sensor 124.

A proximity sensor includes any device positioned proximate a microphone in a stylus, according to various aspects of the present invention, such that is able to sense proximity of a human head to the microphone. A proximity sensor may include a radiation sensor responsive to field radiation impinging on the stylus from a human head. For example, proximity sensor 124 includes radiation sensor 615. Alternatively, a proximity sensor may be a capacitive proximity sensor of the type disclosed in U.S. Pat. No. 5,337,353, issued Aug. 9, 1994 to Boie et al. The detailed description portion (including referenced drawing figures) of this aforementioned patent is incorporated herein by reference.

A radiation sensor according to various aspects of the present invention includes any device responsive to field radiation impinging on the stylus. As discussed above, field radiation includes acoustic radiation and electromagnetic radiation in the radio, infrared, or visible light spectrum. For example, radiation sensor 615 includes two infrared sensors 620 and 630. Sensors 620 and 630 provide respective sensing signals S1 and S2 with amplitudes proportional to the respective amounts of infrared field radiation sensed. Sensor 620 is positioned at the end of a wide aperture cone 622 such that it is responsive to infrared radiation impinging on stylus 110 within a wide angular range AR1. Sensor 630 is positioned at the end of a narrow aperture cone 632, behind sensor 620, such that it is responsive to infrared radiation impinging on stylus 110 within a narrow angular range AR2.

Proximity sensor 124 further includes a comparator 640 for comparing sensing signals S1 and S2. A comparator according various aspects of the present invention includes any circuit for making a determination that a stylus is situated to receive voice input based on one or more suitable conditions of signals provided by sensors. A comparator may perform mathematical functions on such signals, as well as any time-domain processing of the signals that may be desired to establish that the stylus has been properly situated for a given period of time. For example, comparator 640 performs subtraction and division operations to compute a residual portion SR of signal S1 that is uniquely attributable to sensor 620. Comparator 640 also performs comparisons of residual portion SR and signal S2 to two predetermined thresholds $T_1$ and $T_2$, respectively. Comparator 640 thus makes a determination that stylus 110 is situated to receive voice input based on two conditions, which may be mathematically expressed as follows:

Condition A: $S2 \geq T_1$

Condition B: $\dfrac{S2}{S2 - S1} \geq T_2$

When microphone 120 is at a desired proximity to the head of user 240, infrared radiation from the head of user 240 occupies most of angular range AR2. Sensor 630 collects a predetermined amount of infrared radiation, which causes the amplitude of signal S2 to reach the first predetermined threshold (condition A). At the desired proximity, infrared radiation from the head of user 240 occupies only that part of angular range AR1 also occupied by range AR2. The residual portion of signal S1 is thus relatively small, which causes the ratio between signal S2 and the residual portion to reach the second predetermined threshold (condition B).

It is possible for stylus 110 to be situated such that microphone 120 is displaced from the head of user 240 within a desired separation range but oriented away from the head (i.e., having an orientation outside the desired angular range). When stylus 110 is so situated, sensor 630 may be close enough to the head to permit the amplitude of signal S2 to reach the first predetermined threshold (condition A) even though infrared radiation from the head only occupies a portion of angular range AR2. However, the residual portion of signal S1 will then be relatively large because a significant portion of the infrared radiation falls within angular range AR1 but outside range AR2. Consequently, the ratio between signal S1 and the residual portion will fall short of the second predetermined threshold and condition B will not be met.

In a variation, an infrared proximity sensor may be suitably adapted from the disclosure of U.S. Pat. No. 5,330,226 issued Jul. 19, 1994 to Gentry et al. The detailed description portion (including referenced drawing figures) of this aforementioned patent is incorporated herein by reference.

A proximity sensor according various aspects of a present invention may include a radiation sensor that is responsive to acoustic field radiation. For example, stylus 710 of FIG. 7A includes a microphone 720 and an ultrasonic activation circuit 725, which suitably includes: an ultrasonic radiation transmitter/sensor 740; a signal processor 745; and a comparator 750. Transmitter/sensor 740 emits an ultrasonic (e.g., having a center frequency of 50 kHz) pulse of acoustic field radiation from piezoelectric transducer 730. The radiation travels toward the head of user 780 and multiple echoes (depicted as E1, E2, and E3 for illustrative purposes) of the radiation reflect from its surface. Portions of the echoes return to transducer 730 where they are sensed over an interval to form a time-varying signal that is coupled to transmitter/sensor 740.

Transmitter/sensor 740 converts the time-varying signal to a suitable form (e.g., Nyquist filtered discrete-time samples) and conveys the converted signal to signal processor 745. Signal processor 745 provides a distance profile of the sensed acoustic field radiation.

A distance profile is a characterization of the respective distances between an ultrasonic transducer and a scattering object that reflects echoes back to the transducer. For example, a distance profile may be a mathematical curve characterizing a sequential series of discrete-time samples. Each sample may represent amplitude of echoes received at a specific point within a time interval. Such a curve may be characterized by a width of the most prominent peak in the curve and a "center of mass" of the curve $T_{cm}$, which may be calculated as follows:

$$T_{cm} = \frac{\int_0^T tf(t)dt}{\int_0^T f(t)dt}$$

The center of mass of a distance profile curve moves to the left (i.e., closer to t=0) as the scattering object moves closer to the transducer, and to the right as the scattering object moves away. Such a curve has a pronounced peak if the scattering object is relatively flat (e.g., a wall), because all echoes are received at about the same time. Scattering objects having irregular surfaces provide distance profile curves that are relatively distributed and irregular because echoes from different portions of the surface are received at different times and with varying amplitudes. A scattering object having a distinct surface shape (e.g., a human face) can be expected to provide a distinct distance profile curve.

Comparator 750 compares the distance profile from signal processor 745 to an expected profile. The expected profile corresponds to acoustic field radiation expected to impinge on transducer 730 of stylus 710 when microphone 720 is at a predetermined proximity to the head of user 780. The expected profile may be a curve formed from a sequential series of predetermined data values, each representing the expected amplitude of echoes received at a specific point within a time interval. Alternatively, the expected profile may simply be a collection of statistics (e.g., center of mass and peak width) characterizing the expected distance profile when microphone 720 is at a predetermined proximity to the head of user 780. The distance profile may be compared to the expected profile by any suitable signal processing technique (e.g., comparison of statistics or cross-correlation of data points).

A suitable expected profile may be generated by situating stylus 710 such that microphone 720 is at a desired proximity to the head of user 780. Then a programming mode may be entered by suitable user control (e.g., depressing a button on the body of stylus 710) at which point the distance profile is recorded or statistically characterized. The recorded or characterized distance profile then becomes the expected profile, which may be employed for subsequent operation of stylus 710. A single expected profile (or a statistical aggregate using beads of multiple people as scattering objects) may be pre-programmed into multiple production copies of stylus 710.

In a variation, an ultrasonic proximity sensor may be suitably adapted from the disclosure of U.S. Pat. No. 5,848, 802 issued Dec. 15, 1998 to Breed et al. The detailed description portion (including referenced drawing figures) of this aforementioned patent is incorporated herein by reference.

An identification circuit according to various aspects of the present invention includes any circuit housed in a stylus for identifying the stylus. Such a circuit may provide an identification signal that identifies an owner of the stylus by any suitable descriptive or uniquely characteristic content (e.g., a digital code). A few examples of suitable identification circuits and identification signals that may be provided by such circuits are provided in TABLE I below.

TABLE I

| Identification Circuit | Corresponding Identification Signal For Identifying Stylus |
|---|---|
| Microcontroller (possibly shared with transmitter and/or activation circuit) | Numeric or alphanumeric code, provided either periodically or upon request. |
| Dedicated non-volatile memory device (e.g., 4-pin serial PROM) | Binary code (e.g., 48-bit serial bitstream) provided upon request of control circuitry or transmitter. |
| Programmable logic device (possibly shared with transmitter and/or activation circuit) | Binary code (e.g., 48-bit serial bitstream) provided either periodically or upon request. |
| Analog periodic signal source | Periodic modulation of signal from transmitter (e.g., with one or more subcarriers containing characteristic periodic behavior or digitally modulated identification) |

In system 100 (FIG. 1A), identification circuit 128 is a four-pin serial PROM that identifies stylus 110 by providing, upon request by suitable controlling circuitry (not shown), identification signal $S_{ID}$ as a 48-bit serial word to transmitter 122. Transmitter 122 incorporates identification signal $S_{ID}$ with voice signal $S_V$ from microphone 120 and transmits the combined signals to receiver 160 via communications link 115.

Depending on the type of identification circuit employed, a predetermined identification signal may be assigned during or after device fabrication. For example, identification circuit 128 is programmed to provide a 48-bit serial identification signal before being soldered to a printed circuit board along with other components of stylus 110. When a microcontroller is employed for control circuitry in stylus 110, the function of identification circuit 128 may be performed by the microcontroller. Dedicated circuitry for identification circuit 128 is not necessary in such a configuration. A microcontroller-based identification circuit may be programmed after device fabrication as desired, possibly many times. Conventional interface circuitry (e.g., magnetic sensor and cooperating receiver, miniature 3-pin connector and serial port) may be provided to facilitate such programming.

When personalized with an identification circuit, a stylus may be carried about by a user and treated as a personal accessory. For example, a stylus may be shaped and dimensioned to have a look and feel similar to that of a high quality pen. If desired, such a stylus and pen may be packaged and carried about by a user as a complementary set. A personalized stylus may include personalizing indicia on its outer surface such as a monogram or logo.

By facilitating identification, stylus 110 may be used in particularly advantageous applications. In system 200, for example, stylus 110 may be owned by a particular user and used with a tablet that is shared with a number of users. (The structure and operation of system 200 is discussed in greater detail below with reference to FIGS. 2–5.) As exemplified in system 200, a speech recognizer and/or handwriting recognizer may be responsive to identifying signal $S_{ID}$ to select a particular user message model to use when generating text responsive to voice input conveyed via stylus 110. In a collaborative environment, an identification circuit may also enable text data generated by a particular user to be "stamped" with the user's identity. Text may be "stamped," for example, by displaying the text data in a particular color or with a hidden identifier that may be displayed upon user selection.

A user message model is a message model that is specific to a particular user. As discussed in greater detail below, a message model is a model used in recognition of a message. A message is any communication in writing, in speech, or by signals. A message model may include a language model as well as an acoustic and/or handwriting model.

A stylus having an identification circuit may be associated with a user by a suitable registration system. For example, a user may select an identification signal to program into the identification circuit. Alternatively, a registration system may assign an identification signal to the user, and an associate the user with that predetermined identification signal. When stylus 110 is assigned (e.g., sold, loaned by an employer, etc.) to a user, for example, the user may register personal information for association with the predetermined identification signal. Such personal information may include the user's name and security authorizations, and the location (e.g., Internet address) of the appropriate user message model on a wide area network.

Transmission of voice signal $S_V$, identification signal $S_{ID}$, and activation signal $S_A$ from stylus 110 to tablet 150 may be better understood with reference to FIG. 8 (including FIGS. 8A–8D). In system 100, these signals are transmitted via communications link 115 as bursts of serial data. Each burst includes header bits and data bits. The header bits of any given bursts identify that burst as a portion of either signal $S_V$, $S_{ID}$, or $S_A$. In system 100, two header bits are used to distinguish the three signals. The data bits convey signals $S_V$, $S_{ID}$, or $S_A$ as serial data. In system 100, voice signal $S_V$ is conveyed with bursts of 16 data bits and identification signal $S_{ID}$ is conveyed with bursts of 48 data bits. Activation signal $S_A$ of system 100 is conveyed with a single data bit that indicates either an "activate" command or an "inactivate" command. Alternately, a standard number of data bits may be used, with unused bits left unspecified or in a default state.

In the time span depicted in FIG. 8, identification signal $S_{ID}$ is asserted one time in burst 810. Signal $S_{ID}$ may be asserted at a relatively low rate of repetition (e.g., once every second), just often enough to be able to signal a newly used tablet of the identity of stylus 110 without perceptible delay by the user. In a variation, receiving circuitry (not shown) may be included in stylus 110 so that a new tablet may indicate its presence to stylus 110 and signal the need for a new assertion (i.e., serial burst) of identification signal $S_{ID}$. In system 100, signal $S_{ID}$ is conveyed with a large data word length (48 bits) to permit a large number (e.g., $2^{32}$) of pre-certified identification signals to be asserted with an even larger number (e.g., $2^{48-232}$) of invalid identification signals possible using random bit sequences. Consequently, stylus 110 may use signal $S_{ID}$ to validate secured access to tablet 150. Signal $S_{ID}$ may also be used as an encryption key, for example to facilitate secured transmission of a user message model on a wide area network. In identification circuits where security is not a concern, shorter word lengths (e.g., 24 bits) may be used for an identification signal.

Figure 8A:
FIGS. 8A through 8D, is a timing diagram of signals provided by a stylus according to various aspects of the present invention.
Figure 8B:
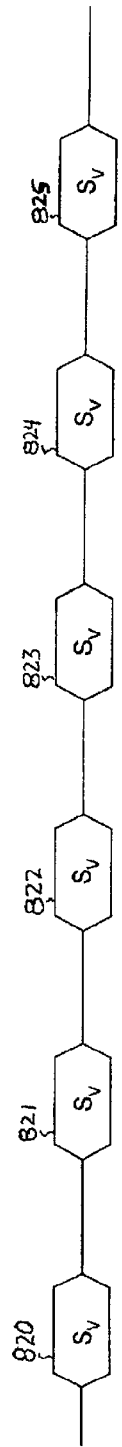
Figure 8C:
Figure 8D:
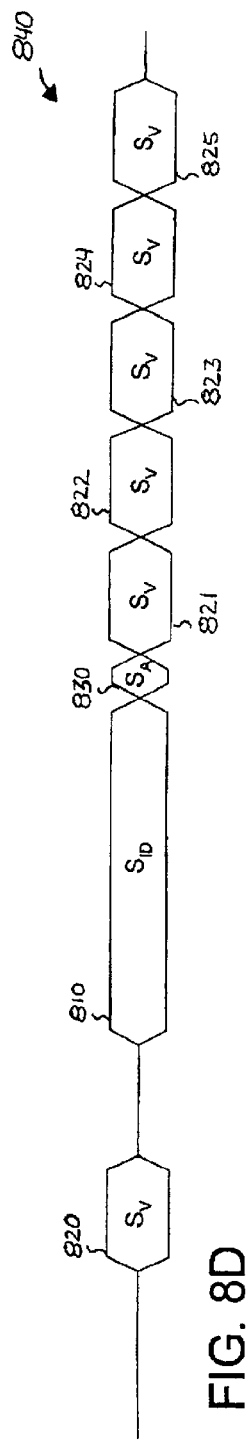

Voice signal $S_V$ is asserted at regular intervals, for example in periodic bursts 820–825 of FIG. 8B. Signal $S_V$ is comprised of periodic samples, which may be provided by a conventional A/D converter (not shown) at any desired point in the signal path from microphone 120 through transmitter 122. The A/D converter may be preceded by a suitable anti-aliasing filter (also not shown). If a delta-sigma A/D converter is used, only a single-pole RC anti-aliasing filter is needed. In system 100, signal $S_V$ is a serial bitstream having bursts 820, 821, 822, 823, 824, and 825 of 16-bit samples, which are provided at a 8 kHz sample rate.

Activation signal $S_A$ is asserted once, as burst 830, in the time span depicted in FIG. 8. Signal $S_A$ may be asserted, with appropriate coding, whenever a change in the activation of speech recognition is desired. Signal $S_A$ may be asserted with an "activate" code when stylus 110 initially becomes situated to receive voice input. For example, activation circuit 126 may so assert signal $S_A$ when user 240 brings stylus 110 toward his or her mouth to begin generating text by voice input. Signal $S_A$ may be again asserted (this time with an "inactivate" code) when stylus 110 is no longer situated to receive voice input. For example, activation circuit 126 may so assert signal $S_A$ when user 240 moves stylus 110 away from his or her mouth and toward tablet 150 to begin editing text by freehand input. In system 100, signal $S_A$ is a serial bitstream with bursts 830 having a single data bit, plus the two header bits.

Signals $S_V$, $S_{ID}$, and $S_A$ are combined into a single signal 840. As may be better understood with reference to FIG. 8D, data bursts in signal 840 do not have identical timing to corresponding bursts in originating signals $S_V$, $S_{ID}$, and $S_A$. Bursts 820–825 from signal $S_V$ do not need to be transmitted at constant intervals. Bursts 820–825 are merely numeric representations of signal samples that have been acquired and digitized at constant intervals. Bursts 820–825 need only to be transmitted at the same mean rate as the rate at which the signal samples were acquired. Speech recognizer 162 may process a series of digital samples (each conveyed by a respective data burst) for processing without concern for exactly when the samples were transmitted in digital form. In the event that timing of the digital samples is a concern, sample buffering (e.g., using a FIFO) may be incorporated in receiver 160 to ensure that samples are passed along to speech recognizer 162 at substantially constant intervals.

Burst 810 from signal $S_{ID}$ is passed on signal 840 as soon as it has been completed. Activation signal $S_A$ takes high priority because it determines whether or not bursts from voice signal $S_V$ are responded to. Consequently, burst 830 from signal $S_A$ is passed on signal 840 immediately after burst 810, even though two bursts 821 and 822 of voice signal $S_V$ are ready to be passed on as well. Bursts 821 and 822 are sent immediately after bursts 830, followed immediately by additional bursts 823, 824, and 825 from signal $S_V$.

In system 100, signal 840 is modulated into an electromagnetic signal suitable for transmission by transmitter 122. Receiver 160 demodulates the signal to provide signals corresponding to signals $S_V$, $S_{ID}$, and $S_A$ to speech recognizer 162. Receiver 160 may also provide some or all of these signals to other portions of tablet 150, as desired.

A tablet interface according to various aspects of the present invention (e.g., tablet interface 164) includes (1) any tablet surface on which a stylus pointer may be manually manipulated and (2) suitable cooperating hardware (e.g., stylus position indicator) and/or software (e.g., for implementing handwriting recognition) that is responsive to freehand input communicated via the pointer. Any conventional tablet surface may be used, including, for example, a position sensitive membrane or an array of ultrasonic receivers for triangulating the position of a stylus pointer having a cooperating ultrasonic transmitter.

A tablet interface and stylus may include cooperating circuitry of the type disclosed in U.S. Pat. No. 5,007,085, issued Apr. 9, 1991 to Greanias et al. The detailed description portion (including referenced drawing figures) of this aforementioned patent is incorporated herein by reference. Further, the detailed description portion (including referenced drawing figures) of any U.S. patent or U.S. patent application incorporated by reference into this aforementioned patent is also specifically incorporated herein by reference.

Preferably, a conventional flat-panel display is integrated into the tablet surface. Such an integrated configuration is advantageous because, inter alia, visible "ink" may be displayed to show freehand input as if the stylus pointer were the actual tip of a pen. A display according to various aspects of the present invention may employ any conventional technology such as LCD. It is contemplated that newer display technologies such as IBM's ROENTGEN display technologies using aluminum and copper display materials, and "reversible paper" (e.g., Xerox's GYRICON display technologies) may also be integrated into a tablet surface in accordance with the invention.

In a variation, "reversible paper" may be overlaid on a tablet surface such that freehand input may be conveyed to the tablet surface through the "paper." In such a variation, the stylus may include an erasable writing marking medium to provide visible indicia of such freehand input on the "paper." Text generated, for example by voice input, may be displayed on a conventional display (e.g., LCD, CRT, etc.) separate from the tablet surface. Color displays permits visible "ink" of different colors to be displayed. However, monochromatic displays may also be used, for example to save costs when incorporated into a number of tablets that are used as "scrap computers."

A tablet interface interprets editing commands responsive to freehand input and provides indicia of the editing commands to an editor. The tablet interface may also interpret handwriting responsive to freehand input and provide text data to the editor. Handwriting may be distinguished from editing commands by a subsystem of the type disclosed in U.S. Pat. No. 5,862,256, issued Jan. 19, 1999 to Zetts et al. The detailed description portion (including referenced drawing figures) of this aforementioned patent is incorporated herein by reference. Further, the detailed description portion (including referenced drawing figures) of any U.S. patent or U.S. patent application incorporated by reference into this aforementioned patent is also specifically incorporated herein by reference. Tablet interface 164 of system 100, for example, suitably includes: tablet surface 152 having an integrated LCD display; conventional hardware (not shown) for determining the position of a stylus on surface 152; and a conventional CPU and memory (also not shown) having indicia of suitable software instructions for the CPU to implement, inter alia, handwriting and/or gesture recognition.

Editing commands include any commands for modifying text data that may be communicated by freehand input. A set of particularly advantageous editing commands is provided in TABLE II below.

TABLE II

| Editing Command | Corresponding Freehand Input |
| --- | --- |
| Delete Text | Straight horizontal line through displayed text; or diagonal or wavy line through block of displayed text. |
| Underline Text | Straight horizontal line immediately below displayed text. |
| Capitalize Text | Two straight horizontal lines immediately below displayed text. |
| Lowercase character | Diagonal line through displayed character. |
| Bold Text | Straight horizontal lines immediately above and below displayed text. |

TABLE II-continued

| Editing Command | Corresponding Freehand Input |
| --- | --- |
| Italicize Text | Diagonal slashes immediately before and after displayed text. |
| Correct Misrecognition of Text | Straight horizontal line through displayed text followed immediately by stylus tap somewhere on the text; or closed curve around block of displayed text followed immediately by stylus tap somewhere within the curve. |
| Indicate Text out of Present Context (without going through correction dialog) | Straight horizontal line through displayed text followed immediately by double stylus tap somewhere on the text |
| Indicate Text out of User Context (without going through correction dialog) | Straight horizontal line through displayed text followed immediately by another straight horizontal line back through the text, then by double stylus tap somewhere on the text, or |
| Copy Text | Closed curve around block of displayed text. |
| Paste Text | Double tap at desired insertion point on display of destination tablet (same or different from source tablet). |
| Move Insertion Point | Single tap at new insertion point on display of desired tablet (same or different from tablet having old insertion point). |
| Find Text | Question mark (?) drawn in isolated white space (e.g., margin) of display. Dictate text to find into provided text input dialog box. |
| Find Other Occurrences of Displayed Text | Closed curve around block of displayed text, immediately followed by question mark (?) drawn in isolated white space (e.g., margin) of display. |

In a variation of tablet 150, tablet interface 164 includes a conventional handwriting recognizer that responds to freehand input to generate text data in addition to, or as an alternative to, text data generated by voice input. In such a variation, tablet 150 performs two types of message recognition: speech recognition and handwriting recognition. As discussed below with reference to FIGS. 2, 3, and 5, an alternative system 200 includes a multi-input message recognizer 310. Message recognizer 310 performs both types of message recognition (speech and handwriting) in accordance with a unified message model. As discussed below, a unified message model according to various aspects of the present invention provides particular advantages.

A tablet according to various aspects of the present invention may include user controls for convenient navigation in an electronic document. For example, tablet 150 includes a "Page Up" button 154 and a "Page Down" button 156 conveniently positioned together near the edge of tablet 150. User 240 may navigate through an electronic document using tablet 150 via depressing buttons 154 and 156 with his or her right thumb. When tablet 150 is positioned for comfortable use, for example resting on the thigh portion of a crossed leg of user 240, only one hand is needed for support and control of tablet 150. Typically, user 240 may then use an opposite hand to manipulate stylus 110 on surface 152 of tablet 150. If user 240 is right-handed, he or she may flip tablet 150 upside-down from the orientation shown in FIG. 1B to support and control tablet 150 with his or her left hand while manipulating stylus 110 with the right hand. If user 240 is one-handed, he or she may prefer to rest tablet 150 on a supporting surface and use stylus 110 for both freehand input and for depressing buttons 154 and 156.

Tablet surface 152 includes an integrated display for displaying an electronic document and any additional user controls that may be desired. Preferably, the display is configured to preserve clarity at a wide range of viewing angles and under varied lighting conditions. When tablet surface 152 is integrated with a color display, additional user controls may include a displayed group of software-based mode controls ("inkwells") at the bottom of tablet surface 152 for changing the behavior of freehand input. For example, user 240 may "dip" pointer 610 of stylus 110 in a red inkwell 157 to begin modifying text data using editing commands such as those in TABLE II. A yellow inkwell 158 may be provided to initiate highlighting and/or annotating of text data, a black inkwell 159 may be provided to initiate freehand input of new text data, and a white inkwell 153 may be provided to initiate erasure (i.e., deletion) of text data. In a variation, touch-sensitive pads (each responsive to contact with pointer 610) may be provided below tablet surface 152 in red, yellow, black, and/or white colors to serve as such "inkwells."

An editor (e.g., editor 168) according to various aspects of the present invention includes any suitable hardware and/or software for modifying text data as specified by editing commands. Examples of suitable editing commands are provided in TABLE II above. As discussed above, text data is any indicia of text that may be stored in conveyed numerically, including numerical codes representing individual units of text.

In one computing model, text data may be considered to be generated by a source other than an editor. In such a model, text data may be stored in a global memory segment that is accessible to both a speech recognizer and an editor. In another computing model, text data may be considered to be generated by an editor that is responsive to external sources of text input. For example, text data may be stored in a local memory segment that is controlled by an editor. External sources of text (e.g., a keyboard interface or speech/handwriting recognizer) may have access to such a local memory segment only through the editor that controls it. In either computing model, an editor has access to text data to both read and modify the text data. For example, editor 168 of tablet 150 (FIG. 1A) performs any desired modifications to text data generated by speech recognizer 162 in accordance with editing commands communicated by freehand input and interpreted by tablet interface 164.

A stylus according to various aspects of the present invention may be advantageously used with a tablet interface and editor of the type disclosed in U.S. Pat. No. 5,855,000, issued Dec. 29, 1998 to Waibel et al. The detailed description portion (including referenced drawing figures) of this aforementioned patent is incorporated herein by reference. Further, the detailed description portion (including referenced drawing figures) of any U.S. patent or U.S. patent application incorporated by reference into this aforementioned patent is also specifically incorporated herein by reference. For example, stylus 110 may be used to convey freehand input (e.g., cursive handwriting, gestures) and voice input via the input device (e.g., a tablet surface) and microphone, respectively, that are disclosed in U.S. Pat. No. 5,855,000 to Waibel et al.

When suitably constructed (e.g., with miniaturized electronics, lightweight materials, a thin, flat form factor, etc.), a tablet according to various aspects of a present invention may be made to have the look and feel of an "electronic notepad," which may be stacked and laid on a desk like a conventional paper document. When so constructed, a tablet such as tablets 150, 252, 254, and/or 256 may be used as a "scrap computer," analogous to scrap paper and having limited individualized identity and importance. Several such tablets may be used together in a network (preferably wireless) such that any one may be picked up and used anywhere in a work environment to display an electronic document and receive freehand input with a stylus. Instead of constantly opening and closing applications in the on-screen windows of a single desktop computer, a user may stack the tablets around an office and have several of them in use for various tasks at the same time.

A networked text processing system according to various aspects of the present invention includes any plurality of tablets networked together to permit exchange of data between them. Such networking provides particular advantages. For example, text data may be transferred between tablets. A document may be displayed in multiple views on displays of multiple tablets. A stylus including a microphone and identification circuit according to various aspects of the present invention may be used to generate text data in accordance with a message model associated with a particular owner of the stylus. Tablets may be networked together through a domain controller, or by peer-to-peer communication.

A network of tablets may be of the type disclosed in U.S. Pat. No. 5,812,865, issued Sep. 22, 1998 to Theimer et al. The detailed description portion (including referenced drawing figures) of this aforementioned patent is incorporated herein by reference. Further, the detailed description portion (including referenced drawing figures) of any U.S. patent or U.S. patent application incorporated by reference into this aforementioned patent is also specifically incorporated herein by reference.

A preferred example of a text processing system including a network of tablets may be better understood with reference to FIGS. 2–5. Networked text processing system 200 suitably includes: a domain controller 220; a plurality (e.g., three) of tablets 252, 254, and 256, each linked via wireless communications links 225 to domain controller 220; a first stylus 210 for conveying message input from a first user 242; and a second stylus 212 for conveying message input from a second user 244. Styluses 210 and 212 are linked to domain controller 220 via wireless communications links 235. System 200 further includes suitable wireless nodes 227 and 230 for establishing communications links 225 and 235, respectively.

A networked text processing system according to various aspects of the present invention may include only a single stylus. When multiple styluses are included, they need not be of the same type so long as they are all compatible with the system. For example, stylus 210 and stylus 212 may both be of the type of stylus 110 (FIGS. 1A, 1B, 6A, 6B). Alternatively, stylus 210 and stylus 212 may be of different types. For example, stylus 210 may be of the type of stylus 110 and stylus 212 may be of the type of stylus 710 (FIGS. 7A and 7B). In variations where the benefit of styluses having microphones is not required, conventional styluses without microphones may be used.

A networked text processing system according to various aspects of the present invention may include a node to a wide area network (e.g., the Internet). A network connection permits one or more local message models that are internal to the system to be initialized to be in conformance with one or more user message models that are remote from the system (and possibly from each other). For example, system 200 includes a network node 232 for establishing a network connection link 237 between a plurality (e.g., two) of user message models 264 and 262. When link 237 is established, local message model 316 may be initialized to be in conformance with message model 264 and/or message model 262, as discussed below.

Wireless nodes 227 and 230 include any suitable transmitter(s) and/or receiver(s) for establishing respective communications links 225 and 235. Transmitter 122 and receiver 160, discussed above with reference to FIG. 1A, are examples of suitable transmitters and receivers, respectively. Node 227 establishes bi-directional communications between domain controller 220 and each tablet 252, 254, and 256. Because communications link 225 is bi-directional, node 227 includes both a transmitter and receiver. Node 230 establishes unidirectional communications between domain controller 220 and styluses 210 and 212. Typically, only a unidirectional communications link is needed to a stylus, because the stylus typically only sends information.

Particular types of communications may be employed in communications links 225 and 235 in particular situations. For example, when tablets 252, 254, and 256 are in close proximity to each other and to domain controller 220 (e.g., on a single work surface in a room), wired connections or infrared field radiation may be employed. When tablets 252, 254, and 256 are located in separate rooms from each other and/or from domain controller 220, suitable RF field radiation (e.g., 1 GHz carrier frequency) may be employed.

A domain controller according to various aspects of the present invention includes any suitable hardware and/or software for controlling the interconnection of networked tablets to each other and to any styluses being used with the tablets. Advantageously, a domain controller may centrally implement functions of a message recognizer so that individual message recognizers are not needed in the networked tablets. In variations where the benefits of a domain controller are not required, networked tablets may each include a message recognizer and a receiver for establishing a communication link with one or more styluses.

Figure 3A:
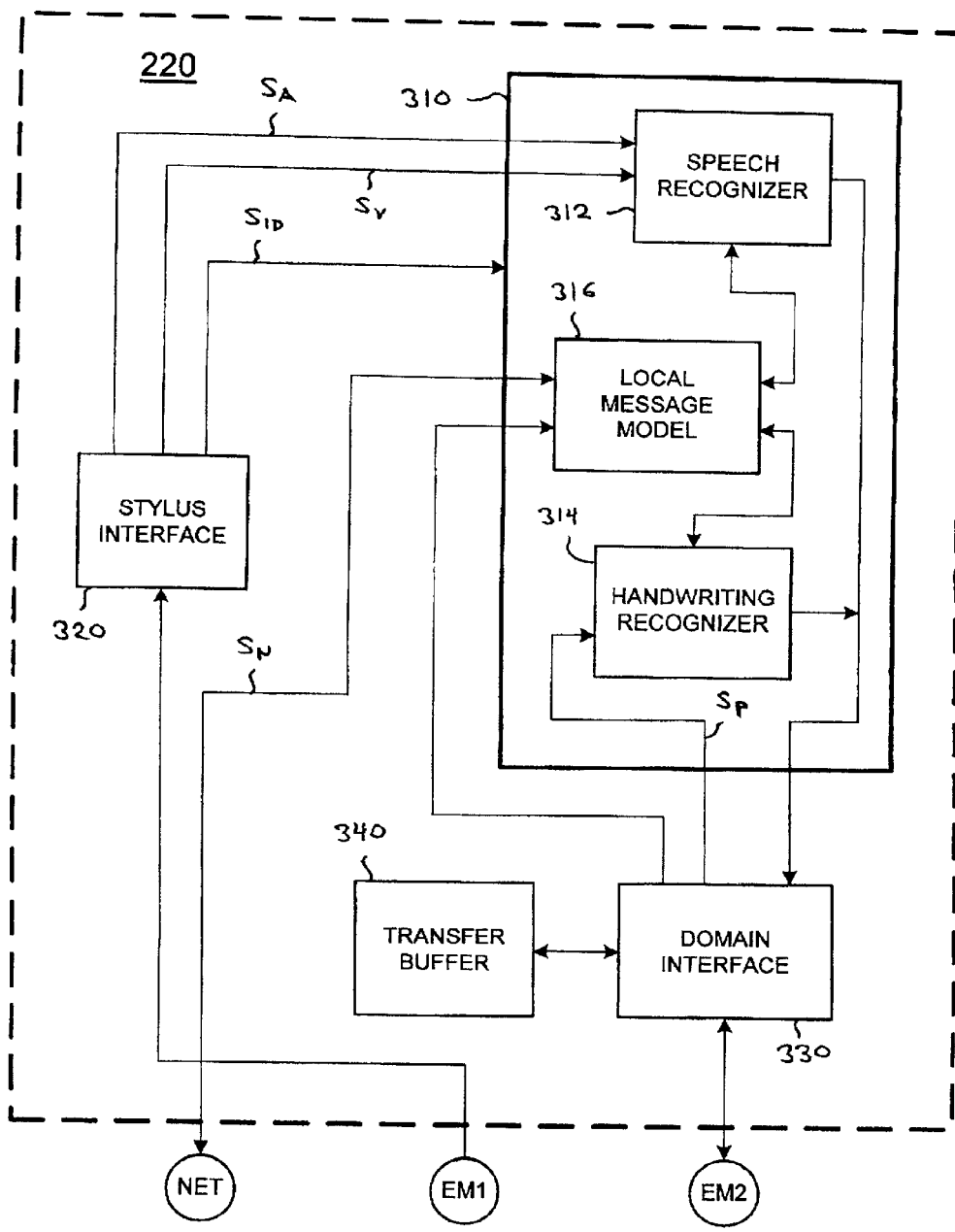
FIG. 3A is a functional block diagram of a domain controller in the system of FIG. 2.

As discussed in greater detail with reference to FIG. 3, exemplary domain controller 220 implements functional blocks including: message recognizer 310; stylus interface 320; and domain interface 330, which is coupled to message recognizer 310 as well as to a transfer buffer 340. As discussed above, interconnection between functional blocks may include hardware connections (e.g., analog connections, digital signals, etc.) and/or software connections (e.g., passing of pointers to functions, conventional object-oriented techniques, etc.). This interconnection is depicted in FIGS. 3A and 3B by signal lines for clarity.

Stylus interface 320 receives electromagnetic signals from one or more styluses (e.g., styluses 210 and 212) and, responsive to the electromagnetic signal(s), couples one or more sets of signals to message recognizer 310. Each set includes a respective activation signal $S_A$, identification signal $S_{ID}$, and voice signal $S_V$.

Respective activation signals $S_A$ activate message recognizer 310 (particularly speech recognizer 312) to provide text data responsive to voice input provided by a user of one particular stylus (e.g., user 242 of stylus 210). In the event that activation signals from multiple styluses are received at once (indicating simultaneous voice input from multiple users), message recognizer 310 may provide respective portions of text data responsive to each voice input, for example by multitasking. Each portion of text may be conveyed to a different tablet for display. For example, text data provided responsive to voice (or handwriting) input from users 242 and 244 may be displayed separately (e.g., as alphanumeric characters, kanji, etc.) on respective tablets 252 and 256. Alternatively, a hierarchy of styluses may be established such that message input conveyed by a low-ranking stylus may be preempted by message input conveyed by a high-ranking stylus. When multiple styluses are in wireless communication with a domain controller, electromagnetic signals from two or more styluses may be multiplexed by any suitable multiple access scheme (e.g., spread spectrum, FDMA, TDMA, etc.).

Respective identification signals $S_{ID}$ permit message recognizer 310 to associate message input conveyed by a particular stylus with a user message model of the user of a stylus. An identification signal according to various aspects of the present invention may include an encryption key to permit message recognizer 310 to interpret a user message model that has been encrypted for secure transmission across a wide area network. Message recognition in accordance with a user message model is described in greater detail below.

Domain interface 330 couples message recognizer 310 to tablets 252, 254, and 256 through wireless node 227 using any suitable multiple access and/or control protocol. Domain interface 330 conveys text data provided by speech recognizer 312 or handwriting recognizer 314 to a desired one of tablets 252, 254, and 256. Domain interface 330 also conveys respective stylus position signals $S_P$ from tablet interfaces of tablets 252, 254, and 256 to handwriting recognizer 314.

Stylus position signal $S_P$ communicates freehand input (conveyed to a tablet interface by a stylus) to handwriting recognizer 314 via domain interface 330. A stylus position signal conveys indicia of the position of the stylus on a tablet surface in any suitable format (e.g., multiplexed binary words representing X, Y coordinates). When a stylus is aimed at, but does not contact, a particular point on a surface, a stylus position signal may convey indicia of the particular point aimed at.

An editor according to various aspects of the present invention may be implemented as part of a domain interface. For example, domain interface 330 may perform the same functions for networked tablets 252, 254, and 256 that editor 168 performs for tablet 150. When a domain controller performs functions of a message recognizer and editor for a plurality of networked tablets, hardware and/or software in the networked tablets may be simplified.

A domain controller may include a transfer buffer (e.g., a portion of memory) to facilitate transmission of data from one networked tablet to another. For example, user 242 may cause text data to be copied from tablet 252 into transfer buffer 340 through domain interface 330. With an editing command from the set provided in TABLE II above, for example, the user may cause a block of displayed text data to be copied by using stylus 210 to draw a closed curve around the block. User 242 may then caused text data to be pasted from transfer buffer 340 to tablet 252. Again using an editing command from the set provided in TABLE II, the user may cause a block of displayed text data to be pasted by using stylus 210 to double-tap at the desired insertion point on the display of tablet 254. When tablets are interconnected in a peer-to-peer network (omitting a domain controller), text data that is copied from the display of a tablet may be stored in a transfer buffer in the tablet until the text data is pasted at a desired insertion point.

A domain controller may include a housing, supporting and/or control circuitry (e.g., power supply, operator controls, etc.), and a conventional CPU and memory (not shown) having indicia of suitable software instructions for the CPU to implement, inter alia, functional blocks of FIG. 3. A "desktop" domain controller may be placed on a work surface as a semi-permanent fixture in a work area. Suitable variations of domain controllers include, for example, unobtrusive (perhaps hidden for aesthetic reasons) wall panels and electronic "white boards" (e.g. "Boards" of the type disclosed in U.S. Pat. No. 5,812,865 to Theimer et al., incorporated by reference above). A domain controller may also be incorporated into one tablet of a plurality of networked tablets.

A message recognizer according to various aspects of the present invention includes any suitable hardware and/or software for recognizing a message of at least one type to provide text data. A message includes any communication in writing, in speech, or by signals. As may be better understood with reference to TABLE III below, examples of types of messages to be recognized include voice input (for speech recognition), freehand input (for handwriting recognition), and visual input (for optical character recognition).

TABLE III

| Type of Message Recognizer | Associated Type(s) of Message Input | Associated Type(s) of Message Model |
|---|---|---|
| Generic: Message Recognizer | Generic: any communication in writing, in speech, or by signals | Generic: Message Model |
| Speech recognizer | Voice input (speech) | Acoustic model, language model |
| Handwriting recognizer | Freehand input (handwriting) | Handwriting model, language model |
| Visual character recognizer | Visual input (printed or handwritten characters that are scanned for OCR) | Character model, language model |
| Sign language recognizer | Visual input (CCD image of signing hands) or tactile input (glove with sensors) | Gesture model, language model |

A message recognizer may include multiple subordinate message recognizers of different types within it. A message recognizer may include, for example, a speech recognizer or a handwriting recognizer, or both. A speech recognizer according to various aspects of the present invention includes any suitable hardware and software for providing text data responsive to voice input. A concise summary of the operation of a conventional speech recognizer is provided in U.S. Pat. No. 5,839,106 to Bellegarda (incorporated by reference below), particularly from column 3, line 46 through column 4, line 43. A handwriting recognizer according to various aspects of the present invention includes any suitable hardware and software for providing text data responsive to freehand input. A handwriting recognizer may be of the type disclosed in U.S. Pat. No. 5,903,668, issued May 11, 1999 to Beemink, incorporated by reference above.

A message recognizer may include a visual handwriting recognizer for generating text data from scanned handwriting, which may be of the type disclosed in U.S. Pat. No. 5,862,251, issued Jan. 19, 1999 to Al-Karmi et al. The detailed description portion (including referenced drawing figures) of this aforementioned patent is incorporated herein by reference. Further, the detailed description portion (including referenced drawing figures) of any U.S. patent or U.S. patent application incorporated by reference into this aforementioned patent is also specifically incorporated herein by reference.

A message recognizer including both a speech and handwriting recognizer may be adapted from the disclosure of U.S. Pat. No. 5,502,774, issued Mar. 26, 1996 to Bellegarda. The detailed description portion (including referenced drawing figures) of this aforementioned patent is incorporated herein by reference. This aforementioned patent cites a number of technical papers that may be reviewed for further guidance on the structure, training, and operation of conventional speech recognizers and handwriting recognizers. In a variation, a message recognizer may include a speech recognizer and handwriting recognizer of the type disclosed in U.S. Pat. No. 5,855,000, issued Dec. 29, 1998 to Waibel et al., incorporated above by reference. In domain controller 220, message recognizer 310 includes both a speech recognizer 312 and handwriting recognizer 314 for recognizing voice and handwriting types of message input, respectively.

A message model according to various aspects of the present invention includes any model (e.g., algorithm, mathematical expression, set of rules, etc.) for defining operation of a message recognizer to provide text data responsive to message input. Conventionally, a message model includes a language model and a model specific to one type of message recognition. For example, a conventional speech recognizer operates in accordance with a type-specific message model consisting of a language model and an acoustic model. As a further example, a conventional handwriting recognizer operates in accordance with its own type-specific message model that consists of a language model and a handwriting model.

Figure 9:
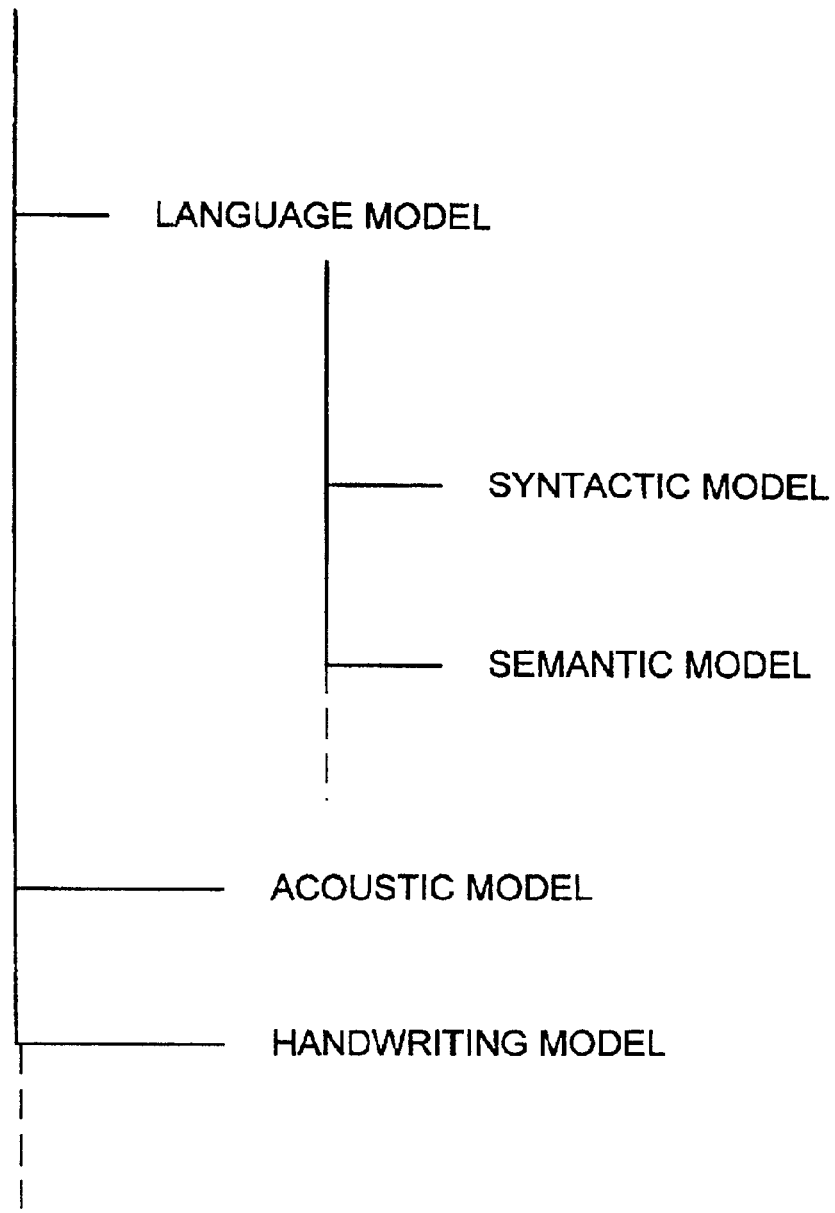
FIG. 9 is a diagram of relationships among various models of a message model according to various aspects of the present invention.

A unified message model according to various aspects of the present invention provides particular advantages over a conventional message model. A unified message model is a message model that includes a shared language model and models specific to at least two types of message recognition. As may be better understood with reference to FIG. 9, a unified message model may suitably include, inter alia, a language model, an acoustic model, and/or a handwriting model.

Figure 14:
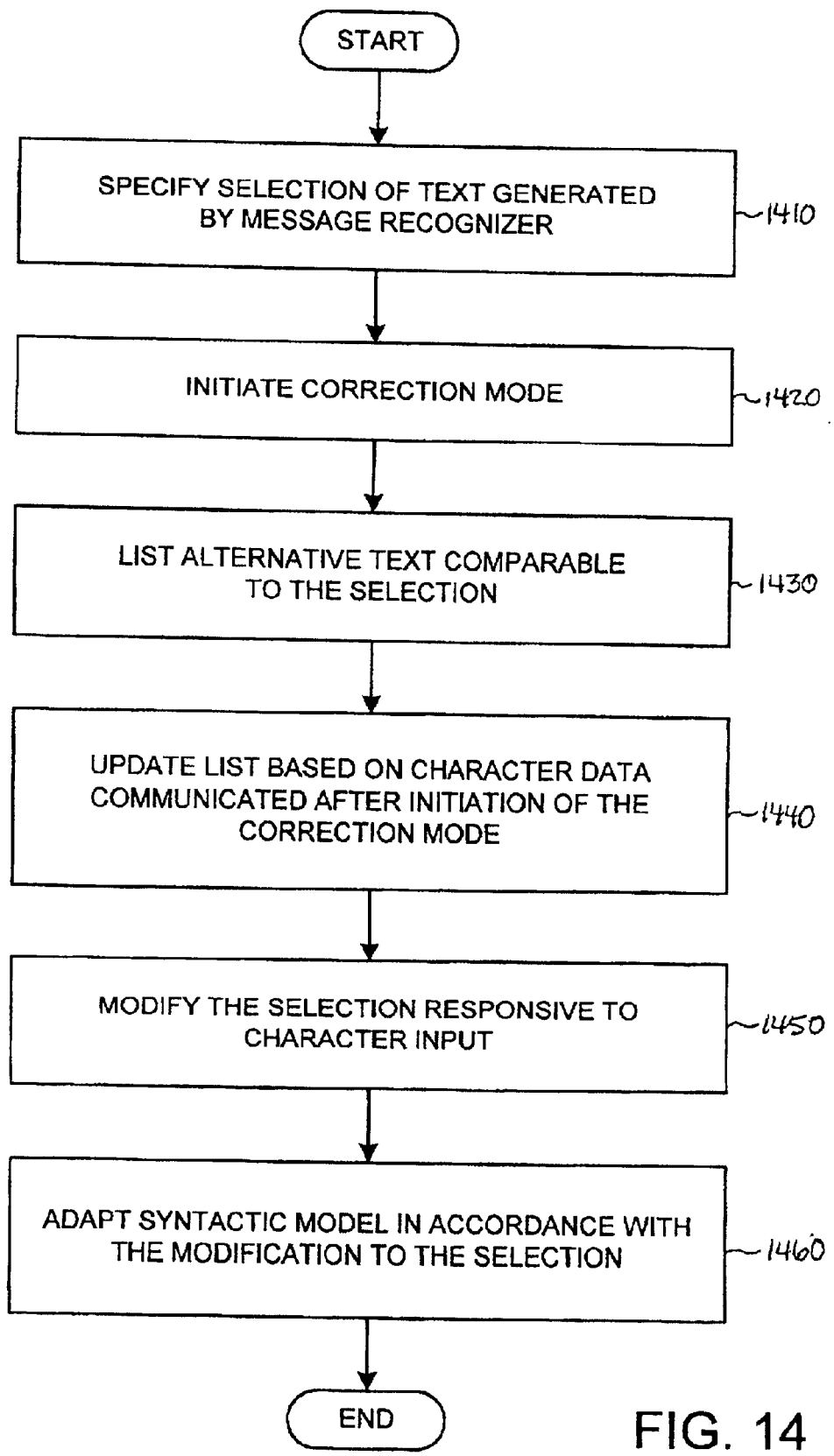
FIG. 14 is a flow diagram of a method for adapting a syntactic model by user correction of misrecognition according to various aspects of the present invention.

A message recognizer may include two or more types of subordinate message recognizers, each of which may operate in accordance with a shared language model. Advantageously, the accuracy of each subordinate message recognizer may be improved by user correction of misrecognition by any of the message recognizers. For example, the syntactic language model in a shared language model may be trained by user correction of any type of erroneous message recognition performed by the message recognizer. An exemplary correction process 1400 is described below with reference to FIG. 14.

A shared language model according to various aspects of the present invention is any language model that may be shared between two types of subordinate message recognizers included within a message recognizer. A message recognizer of a first type may provide text data responsive to a first type of message input (e.g., voice input) in accordance with the shared language model and a first type-specific model (e.g., an acoustic model). A message recognizer of a second type may provide text data responsive to a second type of message input (e.g., freehand input) in accordance with the shared language model and a first type-specific model (e.g., a handwriting model). A language model may be of a conventional type, for example consisting of an N-gram syntactic model.

Figure 3B:
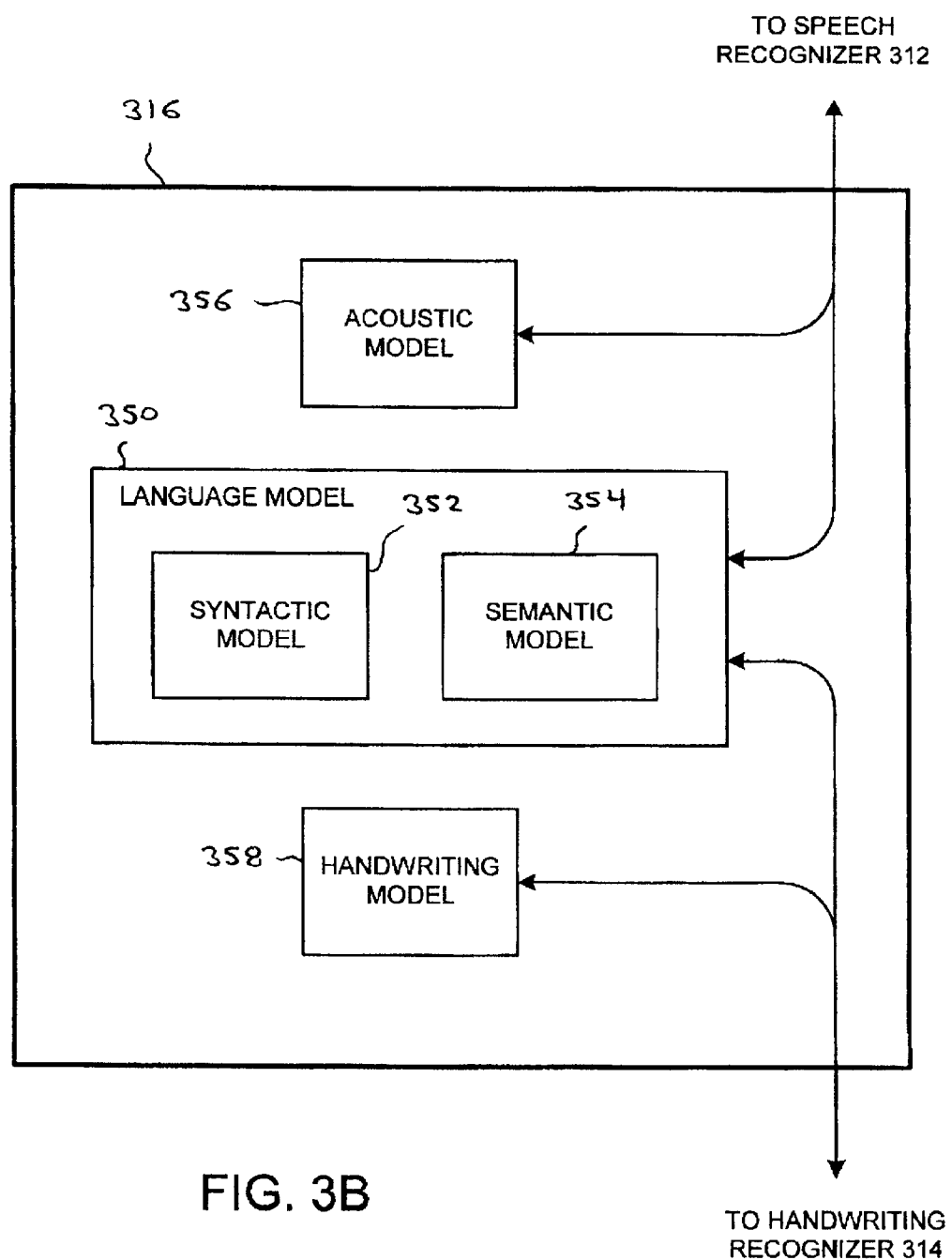
FIG. 3B is a functional block diagram of a message model in the domain controller of FIG. 3A.

An example of a unified message model may be better understood with reference to FIG. 3B. Local message model 316 includes a language model 350, an acoustic model 356, and a handwriting model 358. An acoustic model is any model that may be used to determine basic units of speech (e.g., phonemes, allophones, etc.) responsive to suitably transformed voice input (e.g., by a conventional acoustic feature extractor). A handwriting model is any model that may be used to determine basic units of handwriting conveyed by freehand input (e.g., strokes of printed characters or cursive words) responsive to suitably transformed freehand input, for example as disclosed in U.S. Pat. No. 5,903,668 to Beemink (incorporated by reference above).

Speech recognizer 312 generates text data in accordance with acoustic model 356 and shared language model 350. Handwriting recognizer 314 generates text data in accordance with handwriting model 358 and shared language model 350. Advantageously, user training of language model 350 can improve accuracy of both speech recognizer 312 and handwriting recognizer 314. For example, user correction of misrecognition by speech recognizer 312 adapts syntactic model 352 of shared language model 350. Both speech recognizer 312 and handwriting recognizer 314 then operate in accordance with the adapted syntactic model.

A local message model according to various aspects of the present invention is any message model that is local to a message recognizer operating in accordance with the message model. A message model is said to be local to a message recognizer when the message recognizer may operate in accordance with the message model without the necessity of communications outside its local processing environment. For example, a message model implemented in the same memory space, virtual machine, or CPU as a message recognizer is said to be local to the message recognizer.

A user message model according to various aspects of the present invention is any message model that is specific to a particular user. In variations where the benefits of a unified message model are not required, a user message model may be of a conventional type. A message model is said to be specific to a particular user when the message model may be adapted by training input from the user. Such adaptation provides improved recognition.

Training input includes corrections of misrecognized message input by any suitable form of user input. For example, a tablet (e.g., tablet 252) according to various aspects of the present invention may include a character interface for user correction of misrecognition. A character interface is any user interface (e.g., conventional keyboard or software user interface simulating a keyboard on a display) that is responsive to character input. Character input is a selection of specific characters using a character interface, for example by using a stylus to depress keys on a miniature keyboard or to tap areas of a display that represent keys of a simulated keyboard.

When a character interface (not shown) is provided (e.g., on a display of tablet 252), a language model according to various aspects of the present invention may be adapted by a correction process using (at least in part) character input. An exemplary correction process 1400 may be better understood with reference to FIG. 14. Process 1400 begins at step 1410 with a user specifying, typically by freehand input, a selection of text that has been generated (erroneously) by a message recognizer. At step 1420, a correction mode is initiated for modifying the selection.

A user may specify text and initiate a correction mode by communicating any appropriate editing command (e.g., with freehand input, voice input, etc.). With an editing command from the set provided in TABLE II above, for example, the user may cause steps 1410 and 1420 to be carried out by using a stylus to draw a straight horizontal line through a displayed text segment, then immediately tapping the stylus somewhere on the text segment. As alternatively specified in TABLE II, a user may also specify a selection of text by drawing a closed curve around a block of displayed text (e.g., a phrase of several words), then immediately tapping the stylus somewhere within the curve.

At step 1430, a list of alternative text comparable to the selection is provided. The list includes text segments that each received a high score (but not the maximum score) during hypothesis testing of the message recognizer. Two lists of alternative text of the type that may be produced at step 1430 are shown by way of example in TABLE IV and TABLE V below. As discussed below, the lists of TABLE IV and TABLE V were displayed in a correction mode of a conventional computer configured as a speech recognizer by executing conventional speech recognition software, marketed as NATURALLY SPEAKING, Preferred Edition, version 3.01, by Dragon Systems, Inc.

At step 1440, the list of alternative text is updated, based on character data communicated after initiation of the correction mode. In a conventional speech recognizer such as a computer executing the NATURALLY SPEAKING software, the displayed list of alternative text changes as different characters are entered by a user using character input.

At step 1450, the selected text segment is modified responsive to the character input. Step 1450 is carried out when the user indicates that the text segment as modified accurately reflects the message input provided by the user. In a conventional speech recognizer such as a computer executing the NATURALLY SPEAKING software, the modifications to the selected text segment are entered when the user selects an "OK" control of a displayed user interface dialog.

At step 1460, the syntactic model is conventionally adapted in accordance with the user's modification to the selected text segment.

When a language model includes a semantic model according to various aspects of the present invention, training input also includes user identification of a present context or a user context. User identification of context may be performed in addition to, or alternatively to, correction of misrecognized message input.

Local message model 316 may be initialized to be in conformance with one or more user message models (e.g., user message model 262 or 264). A local model is said to be in conformance with a user model when a message recognizer operating in accordance with the local model behaves substantially as if it were actually operating in accordance with the user message model.

Initialization of a model entails creation of a new model or modification of a model from a previous configuration to a new configuration. A local model may be initialized by any suitable hardware and/or software technique. For example, a local model may be initialized by programming of blank memory space with digital indicia of a user model that the local model is to conform with. Alternatively, a local model may be initialized by overriding of memory space containing digital indicia of a previous configuration with indicia of digital indicia of a new configuration. The previous configuration of the local model is in conformance with a previous local model (ie., of a previous user). The new configuration is in conformance with a new local model (i.e., of a new user).

In system 200, local message model 316 may be initialized to be in conformance with, for example, user message model 262. During this initialization, digital indicia of user message model 262 is transferred to the local processing environment of message recognizer 310 via network connection 237 and digital signal $S_N$.

Message recognizer 310 may retrieve a selected user message model from a remote database via, for example, an Internet connection. Identifying signal $S_{ID}$ may specify an Internet address (e.g., URL) from which the stylus owner's model may be retrieved. Local message model 316 may then be initialized to conform to the remotely located user model. When security is a concern, the user message model may be transmitted in an encrypted format, to be decrypted in accordance with a key that may be provided, for example, in identifying signal $S_{ID}$.

After a message recognition session, a local message model may have been adapted by user training, preferably including both correction of misrecognition and user identification of a user context. Advantageously, a user message model may be initialized to be in conformance with an adapted local message model. For example, message recognizer 310 may transfer digital indicia of local message model 316 (after user training) from its local processing environment to a remote database where user message model 262 is stored. User message model 262 may thus be initialized to be in conformance with adapted local message model 316. Accordingly, in message recognizer according to various aspects of the present invention provides a user with the opportunity to adapt and modify his or her user message model over time, regardless of the particular system in which he or she employs it for message recognition. A user of such a message recognizer may develop a highly adapted message model by, and for, use of the model in many different message recognition systems.

User training may include adaptation of an acoustic model in the message model. Advantageously, the acoustic model may be adapted over time using a single stylus-mounted microphone. Use of the same stylus for user training provides acoustic consistency, even when the stylus is used with many different message recognition systems.

In variations where the benefits of a user message model are not required, a message recognizer may operate in accordance with a number of generic local message models, each generally tailored to portions of an expected user population. When so configured, domain controller 220 may include a local database in non-volatile memory (not shown) for storing such models.

As discussed above, a message recognizer according to various aspects of the present invention may be responsive to message input from a plurality of users to provide respective portions of text data. Such a message recognizer may operate in accordance with a plurality of respective local message models. Each respective local message model may be initialized to be in conformance with a user message model of a particular user. For example, message recognizer 310 may operate at times in accordance with a second local message model (not shown). This second model may be initialized to be in conformance with a second user message model, for example user message model 264.

A language model is any model that may be used to determine units of language responsive to input sequences of text segments. Such input sequences may be derived, for example, from voice input and/or freehand input in accordance with a respective acoustic model or handwriting model. In message recognizer 310, for example, speech recognizer 312 first derives units of speech responsive to feature vectors (which are conventionally derived from voice signal $S_V$) in accordance with acoustic model 356. (Acoustic model 356 is part of unified message model 316.) Speech recognizer 312 then derives units of language (here, strings of text data) from the units of speech in accordance with language model 350. Speech recognizer 312 provides the derived units of language as text data to domain interface 330. Handwriting recognizer 314 first derives units of handwriting responsive to feature vectors (which are conventionally derived from stylus position signal $S_P$) in accordance with handwriting model 358. Handwriting recognizer 314 then derives units of language (again, strings of text data) from the units of handwriting in accordance with language model 350. Handwriting recognizer 314 provides the derived units of language as text data to domain interface 330. Handwriting recognizer 314 also provides (to domain interface 330 and ultimately to an editor) indicia of any editing commands conveyed by freehand input, as communicated by stylus position signal $S_P$.

Language model 350 includes a syntactic model 352 and a semantic model 354. Syntactic model 352 provides a set of a priori probabilities based on a local word context, and may be a conventional N-gram model. Semantic model 354 provides probabilities based on semantic relationships without regard to the particular syntax used to express those semantic relationships. As described below, semantic model 354 may be adapted according to various aspects of the present invention for accurate identification of a present context or a user context. In a variation where the benefits of user context identification are not required, semantic model 354 may be of the type disclosed in U.S. Pat. No. 5,828,999 to Bellegarda et al. (incorporated by reference below). In a further variation where the benefits of semantic analysis are not required, language model 350 may omit semantic model 354.

As discussed above, a language model may include a syntactic model, a semantic model having a plurality of semantic clusters, or both. For example, a language model may be of the type disclosed in U.S. Pat. No. 5,839,106, issued Nov. 17, 1998 to Bellegarda and U.S. Pat. No. 5,828,999, issued Oct. 27, 1998 to Bellegarda et al. The detailed description portion (including referenced drawing figures) of each of these two aforementioned patents is incorporated herein by reference. Further, the detailed description portion (including referenced drawing figures) of any U.S. patent or U.S. patent application incorporated by reference into either of these two aforementioned patents is also specifically incorporated herein by reference.

The semantic model may be part of a shared language model of the invention. In message recognizer 310, for example, semantic model 354 is part of shared language model 350. A message recognizer may include two or more subordinate message recogruzers, each of which may operate in accordance with the semantic model in the shared language model. Advantageously, the accuracy of each subordinate message recognizer sharing a language model that includes a semantic model according to various aspects of the present invention may be improved by user identification of context.

The semantic model may be part of a shared language model of the invention. In message recognizer 310, for example, semantic model 354 is part of shared language model 350. A message recognizer may include two or more subordinate message recognizers, each of which may operate in accordance with the semantic model in the shared language model. Advantageously, the accuracy of each subordinate message recognizer sharing a language model that includes a semantic model according to various aspects of the present invention may be improved by user identification of context.

A message recognizer (e.g., speech recognizer 162 of system 100 or message recognizer 310 of system 200) may perform a context-sensitive hypothesis test of text segments against message input in accordance with an adapted semantic model. In cooperation with the message recognizer, the adapted semantic model biases against those tested segments that have a high probability of occurrence in clusters considered to be outside the present context. Advantageously, the model may cause such biasing by simply applying a negative bias against those text segments having a high probability of shared cluster occurrence with stop segments. A semantic model is said to bias against a tested segment when a message recognizer scores the tested segment less favorably in a hypothesis test due to the operation of the semantic model.

In the discussion below of semantic models according to the invention, two examples of semantic model operation are provided to illustrate the benefit of user context identification in particular situations. The first of these two examples illustrates how certain text segments can be expected to be especially useful for indicating context as stop segments. The second example illustrates how certain text segments are less useful for indicating context.

The first example of semantic model operation is referred to herein as the "Coors Uncle" example. In the "Coors Uncle" example, the phrase "straight horizontal line through" was dictated (i.e., communicated by voice input) to a conventional speech recognizer, which was a computer executing the NATURALLY SPEAKING software discussed above. The speech recognizer provided the text data "straight Coors Uncle line through" in response to the voice input. The dictated phrase and the speech recognizer's alternative text segments are listed below in TABLE IV.

TABLE IV

Dictated Phrase: Straight [Coors Uncle] horizontal line through

| Ranking | Alternative Text |
|---|---|
| 1 | Coors Uncle |
| 2 | cores Uncle |
| 3 | core is Uncle |
| 4 | Coors uncle |
| 5 | Cora's uncle |
| 6 | core his uncle |
| 7 | or his uncle |
| 8 | core as Uncle |
| 9 | corps is Uncle |
| 10 | quarters Uncle |

The phrase "straight horizontal line through" was dictated by the Applicant during preparation of the present patent application. The text data "straight Coors Uncle line through," generated by the conventional speech recognizer (a computer executing the NATURALLY SPEAKING software) in response, was clearly out of the context of such a document. Because it would be very unusual for the Applicant to write a document relating to the consumption of alcoholic beverages, words relating to alcohol consumption (e.g., beer, brewing, etc.) are unlikely to appear in any document the Applicant generates. If a message recognizer operating in accordance with the semantic model of the invention were used, the word COORS (a registered trademark of the Coors Brewing Company) would likely have been designated as a stop word outside the user context.

As discussed below, a user may identify stop segments by any suitable system or method. In the "Coors Uncle" example, the user may identify the word COORS as being outside the user context by drawing a double line through it, for example in the first alternative text listing "Coors Uncle." Double lines may then appear drawn through each occurrence of the word COORS, since the word has been identified as a "user context" stop segment.

A non-technical word that appears in a technical document such as a patent application may be designated as a stop word outside the present context, regardless of the author's overall writing habits. For example, words relating to familial relationships (including the word UNCLE) are not typically used in patent applications. In the "horizontal" example, a user may identify the word UNCLE as being outside the present context (but not the user context) by drawing a single line through it, for example in the first alternative text listing "cores Uncle." Single lines may then appear drawn through each occurrence of the word UNCLE, since the word has been identified as a "present context" step segment.

A user context is the context of all documents generated by a particular user. A user context may also be viewed as a context of all documents generated by a group of users, such as members of a particular collaborative group. Examples of collaborative groups include project teams, institutions, corporations, and departments. Members of a collaborative group may share a common pool of stop segments. A stop segment designated by any member of the group as being outside his or her user context is then considered to be outside the user context of each group member. In one variation, a leader of the group may review a list of pooled stop segments and edit the list. In another variation, each group member may remove pooled user stop segments (at least from operation of message recognition responsive to his or her message input) that the member considers to be inside his or her particular user context.

Advantageously, a user context may exclude words not consistent with the writing style of a particular user (or collaborative group). For example, a user who writes only technical documents may appreciate the opportunity to designate profanities and slang terms as being outside the user context. The designation of a profanity or slang term as a stop word outside the user context may cause a semantic model of the invention to bias against other profanities or slang terms. Alternatively, a fiction writer may appreciate the opportunity to designate technical terms as being outside the user context.

The second example of semantic model operation is referred to herein as the "words on" example. In the "words on" example, the phrase "straight horizontal line through" was again dictated (i.e., communicated by voice input) to a conventional speech recognizer, which was again a computer executing the NATURALLY SPEAKING software. The speech recognizer provided the text data "straight words on a line through" in response to the voice input. The dictated phrase and the speech recognizer's alternative text segments are listed below in TABLE V.

TABLE V

Dictated Phrase: Straight [words on a] horizontal line

| Ranking | Alternative Text |
|---|---|
| 1 | words on a |
| 2 | words on |
| 3 | for his all |

The phrase "straight horizontal line through" was dictated the second time by the Applicant during preparation of the present patent application. The text data "straight words on a line through," generated by the conventional speech recognizer (a computer executing the NATURALLY SPEAKING software) in response, was not clearly out of the context of such a document. The text segments "words," "on," and "a" are common words that appear frequently in many different types of documents including the present patent application. If a message recognizer operating in accordance with the semantic model of the invention were used, none of the alternative text segments listed in TABLE V would be useful to designate as stop segments.

A semantic cluster includes any semantic association of text in a language model. In a first exemplary semantic model of the present invention, a semantic cluster is of a first type. The first type of semantic cluster is a mathematically derived group of vectors representing text segments (e.g., words). The vectors may lie in a word-document vector space defined by a word-document matrix, which tabulates the number of times each word of a suitable training corpus occurs in each of a plurality of documents (or paragraphs, sections, chapters, etc.) in the corpus. The vectors may be clustered, for example, based on a distance measure between the word vectors in the vector space after a singular value decomposition of the word-document matrix. Such a technique is taught in U.S. Pat. No. 5,828,999 to Bellegarda et al., incorporated by reference above. The disclosure found from column 4, lines 8–54; from column 5, line 35 through column 7, line 35; and column 8, lines 3–24 of the aforementioned patent is considered particularly instructive for the identification of semantic clusters of this first type.

In a second exemplary semantic model of the present invention, a semantic cluster is of a second type. The second type of semantic cluster is a discrete grouping of text that may be expected to have a particular context, e.g., discussing a particular topic. Examples of semantic clusters of this type include documents within a document collection (e.g., an article within the standard Wall Street Journal training corpus), paragraphs within a document, and sections of text separated by headings in a document.

Additional types of semantic clusters include, for example, a third type of semantic cluster, which is defined with respect to an individual reference word that is considered to be indicative of a particular context. For example, a semantic cluster of this type may include all words found within a given number (e.g., 50) of a particular reference word in a training corpus. Such a semantic cluster may be given indefinite boundaries by applying words further from the reference word may given a lower semantic association than text close to the reference point.

Figure 10:
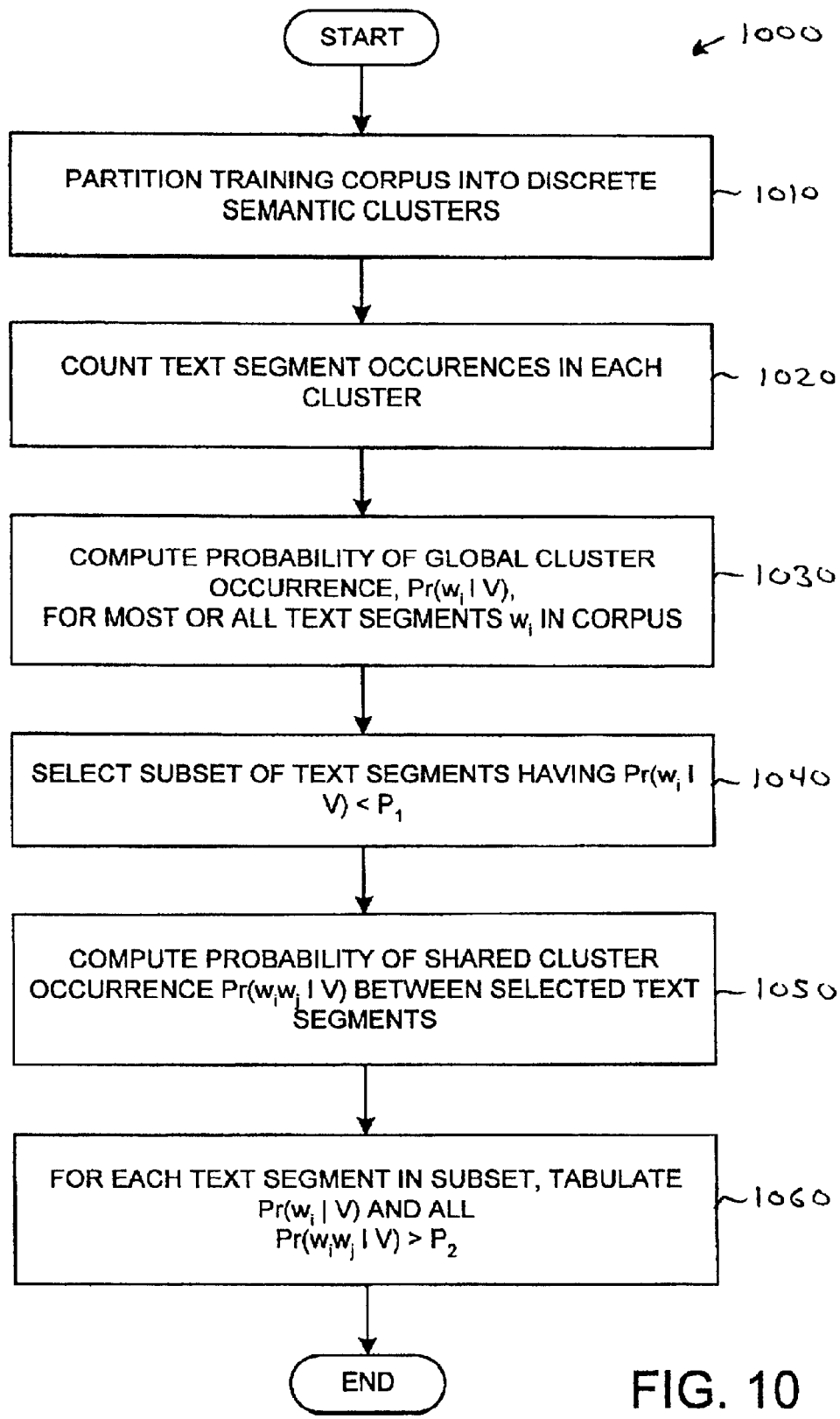
FIG. 10 is a flow diagram of a method for the identification of semantic clusters according to various aspects of the present invention.

A method 1000 for the identification of semantic clusters of the second type (for the second exemplary semantic model) may be better understood with reference to FIG. 10. Method 1000 begins with a suitable training corpus, which is partitioned into discrete semantic clusters at step 1010. Discrete semantic clusters are semantic clusters of the second type discussed above. A commonly used corpus is the standard Wall Street Journal corpus. Another corpus, referred to as TDT-2, is available from Linguistic Data Consortium (LDC). The TDT-2 corpus consists of about 60,000 stories collected over a six-month period from both newswire and audio sources. When the TDT-2 corpus is employed in process 1000, each story is preferably partitioned into a discrete semantic cluster at step 1010.

At step 1020, each semantic cluster is analyzed. Text segments occurring in each cluster are counted and tabulated into a two-dimensional matrix Z. This matrix is used at steps 1030 and 1050 to compute probabilities of global and shared cluster occurrence, respectively.

Figure 11:
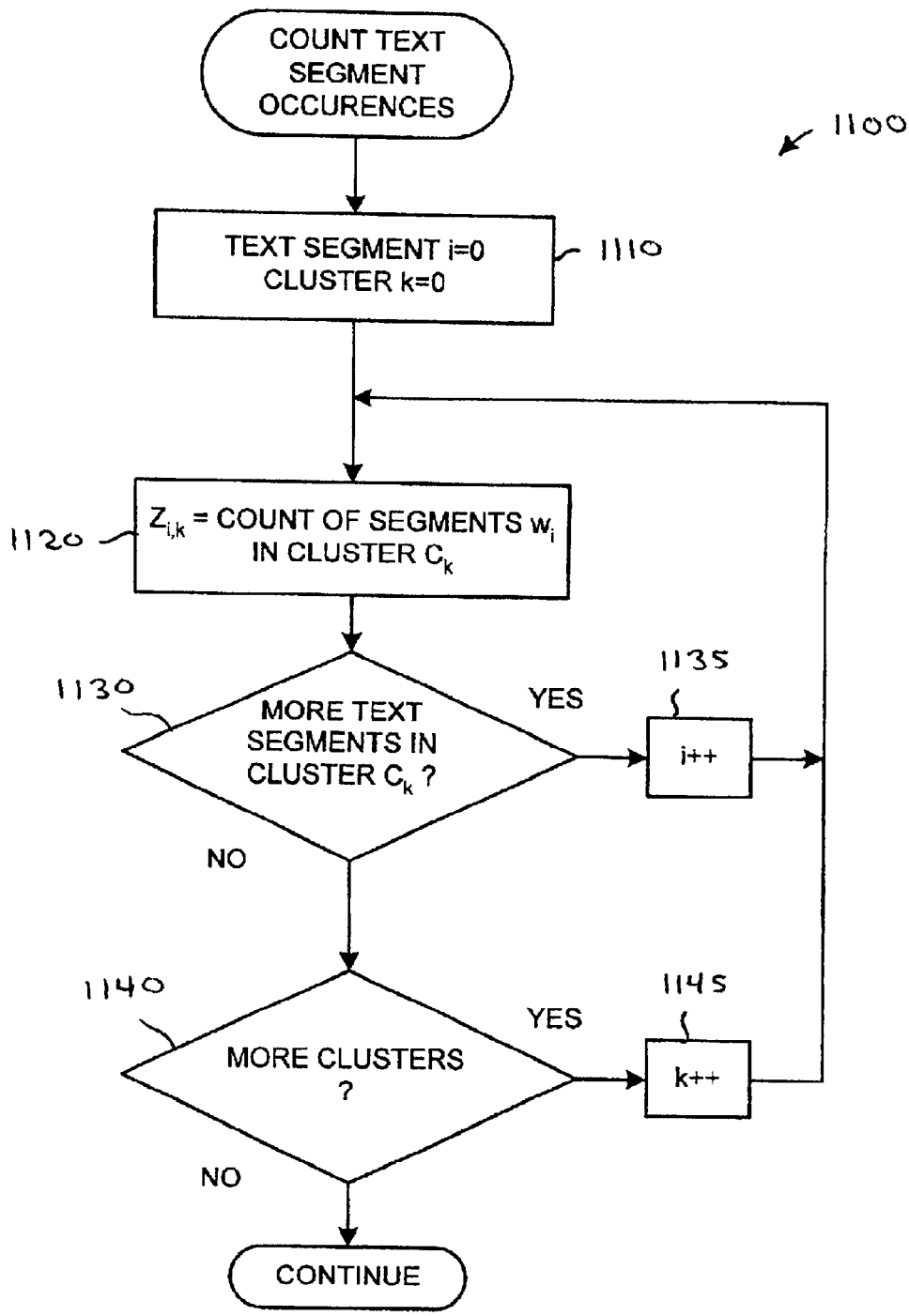
FIG. 11 is a flow diagram of a process for analyzing semantic clusters of a training corpus according to various aspects of the present invention.

An exemplary process 1100 for carrying out step 1020 may be better understood with reference to FIG. 11. At step 1110, process 1100 begins by setting pointers i and k both to zero for counting of the first text segment $w_0$ in the first cluster $C_0$. At step 1120, a count is made of the number of occurrences of one text segment $w_i$ of the corpus in one cluster $C_k$ of the corpus. When step 1120 is first carried out after step 1110, the count is made of the number of occurrences of the first text segment $w_0$ in the first cluster $C_0$. Each count is tabulated in a respective element $Z_{i,k}$ of matrix Z, starting with element $Z_{0,0}$.

After each occurrence of step 1120, a determination is made at decision step 1130 as to whether or text segments of the corpus are still to be counted in the present cluster. If so, pointer i is incremented at step 1135 and step 1120 is repeated to count the number of occurrences of the next text segment of the corpus in the present cluster. If no text segments remain to be counted in the present cluster, process 1100 continues at decision step 1140.

At decision step 1140, a determination is made as to whether or semantic clusters of the corpus are still to be analyzed. If so, pointer k is incremented at step 1145 and step 1120 is repeated to count the number of occurrences of the first text segment of the corpus in the next cluster. If no clusters remain to be analyzed, process 1100 is complete and method 1000 continues at 1030 (FIG. 10).

At step 1030, the probability of global cluster occurrence is computed for most (or all) text segments in the corpus. In the second exemplary semantic model, the probability of global cluster occurrence may be expressed as $Pr(w_i|V)$. "V" indicates "given the entire vocabulary (i.e., corpus)." $Pr(w_i|V)$ is the probability that a given text segment $w_i$ of the corpus will appear in a random sample (adjusting for sample size) of text segments chosen from the corpus. $Pr(w_i|V)$ may also be viewed as the probability that a randomly chosen text segment of the corpus (globally, i.e., without regard to any particular semantic cluster) will be a given text segment $w_i$. The more times a given text segment wi appears in the corpus, no matter how distributed, the higher probability $Pr(w_i|V)$ will be.

Probability $Pr(w_i|V)$ may be computed (at least as an estimate) by any suitable statistical technique. For example, probability $Pr(w_i|V)$ may be computed for a given text segment wi based on the total number of occurrence of segment wi in matrix Z, divided by the total number of occurrences of all segments in matrix Z. Determination of probability $Pr(w_i|V)$ may be expressed by the following equation:

$$Pr(w_i | V) \cong \frac{\sum_{k=0}^{N} Z_{i,k}}{\sum_{j=0}^{L} \sum_{k=0}^{M} Z_{j,k}}$$

At step 1040, a subset of text segments is selected for further analysis. The subset excludes text segments having a very high probability of global cluster occurrence. In the second exemplary semantic model, text segments that appear often are less likely to receive a negative bias, even though they may appear often in the same semantic clusters as stop words. The expectation is that commonly occurring text segments can be expected to occur in many different contexts, and that the present context is less likely to exclude such text segments.

By selecting text segments having a probability of global cluster occurrence $Pr(w_i|V)<P_1$, where $P_1$ is a predetermined upper limit of "commonness," words likely to be biased against may be omitted from consideration in the second exemplary semantic model. In the "Coors Uncle" example, the word BAR may be expected to appear in semantic clusters where consumption of alcohol may be discussed and could thus receive some negative bias when the word COORS is identified as a stop segment. However, the word BAR also has many synonymous meanings (e.g., "sand bar," "metal bar," "patent bar," etc.) and would have relatively high probability of global cluster occurrence in most corpora, thus limiting the negative bias. By omitting words such as BAR that are likely to be biased against less severely, the second exemplary semantic model may be simplified.

At step 1050, the probability of shared cluster occurrence is computed for the selected text segments. In the second exemplary semantic model, the probability of shared cluster occurrence may be expressed as $Pr(w_i w_j|V)$. $Pr(w_i w_j|V)$ is the probability that two given text segments $w_i$ and $w_j$ of the corpus will appear together in a random sample (adjusting for sample size) of text segments chosen from the corpus. The more times two given text segments $w_i$ and $w_j$ appear together in semantic clusters of the corpus, the higher probability $Pr(w_iw_j|V)$ will be.

Probability $Pr(w_iw_j|V)$ may be computed (at least as an estimate) by any suitable statistical technique. For example, probability $Pr(w_iw_j|V)$ may be computed for a given combination of text segments $w_i$ and $w_j$ based on the total number of occurrence of segment wi in matrix Z, divided by the total number of occurrences of all segments in matrix Z. The probability of shared cluster occurrence of text segments $w_i$ and $w_j$ may be estimated as the ratio between (1) the number of times text segments $w_i$ and $w_j$ can be paired together within semantic clusters of the corpus and (2) the total number of text segments in the corpus. Such an estimation of probability $Pr(w_i|V)$ may be expressed by the following equation:

$$Pr(w_iw_j \mid V) \cong \frac{\sum_{k=0}^{N} \operatorname{Min}\{Z_{i,k}, Z_{j,k}\}}{\sum_{m=0}^{M} \sum_{k=0}^{N} Z_{m,k}}$$

Step 1060, probabilities $Pr(w_i|V)$ and $Pr(w_iw_j|V)$ are tabulated for each text segment in the subset and method 1000 is completed. An exemplary data structure 1200 for the tabulation of these probabilities may be better understood with reference to FIG. 12. Data structure 1200 includes tabulations of probabilities relating to three example words UNCLE, COORS, and BEACH of an exemplary subset. As discussed above, these words are used to illustrate two examples of message recognition in accordance with a semantic model of the present invention. As illustrated in data structure 1200, for example, the word UNCLE may be expected to have a high probability of shared cluster occurrence with other words related to familial relationships. By way of example (and not intended to be a report of actual results), words AUNT, NEPHEW, RELATIVE, and BROTHER are shown in data structure 1200 as secondary text segments under the primary text segment UNCLE. (In data structure 1200, a text segment that forms the heading of a listing is said to be a primary text segment and a text segment listed under the heading is said to be a secondary text segment.) In a tabulation performed at step 1060 of method 1000, using a training corpus described above, it is expected that the secondary text segments shown in FIG. 12 would be listed with relatively high probabilities $Pr(w_iw_j|V)$ under each primary text segment shown.

In a variation, step 1060 may include manual editing of a tabulation such as that of data structure 1200. Primary text segments known to be poor indicators of context as stop segments may be manually identified and purged from the tabulation of data structure 1200, along with text segments listed under the purged text segments. For example, a manual (i.e., human) editor may know, based on his or her knowledge of linguistics and human intelligence, that certain secondary text segments have a closer semantic association with a given primary text segment than the probabilities otherwise generated by method 1000 would indicate. Accordingly, the manual editor may adjust the probability $Pr(w_iw_j|V)$ for each of those secondary text segments. In a further variation, step 1060 may include refinement of a tabulation such as that of data structure 1200 in an iterative design process. Such a design process may include manual and/or computer controlled editing of such a tabulation. For example, the design process could add and purge various secondary text segments, and modify probability $Pr(w_i \ w_j \ |V)$ for various secondary text segments, with the goal of minimizing an error constraint. A suitable error constraint may be the perplexity of message recognition, which may be (using a suitable test corpus) performed in accordance with each semantic model resulting from each iteration of the tabulation.

As discussed above, a stop segment is any text segment (e.g., word, phrase, portion of a compound word) that has been identified by a user as being expected to be outside the present context or the user context. Stop segments may be identified by a user in a context definition mode. For example, a context definition mode may present the user with (1) a maximum likelihood text segment and (2) alternative text segments that the user could identify as being outside the present context or user context. The user may select alternative text segments to identify them as stop segments, for example by freehand input.

A user may identify stop segments by any suitable system or method. Stop segments may be identified in a context definition mode, which may be initiated whenever the identification of stop segments may be useful to determine context. The context definition mode may be initiated during a message recognition session, or prior to it. (An example of a message recognition session is the dictating of a document by voice input, with editing of the document by freehand input.) A context definition mode may be initiated automatically when alternative text segments are located (e.g., during hypothesis testing) that may be expected to be especially useful for indicating context as stop segments. Alternatively or in addition, a context definition mode may be initiated manually (i.e., by the user).

Figure 13:
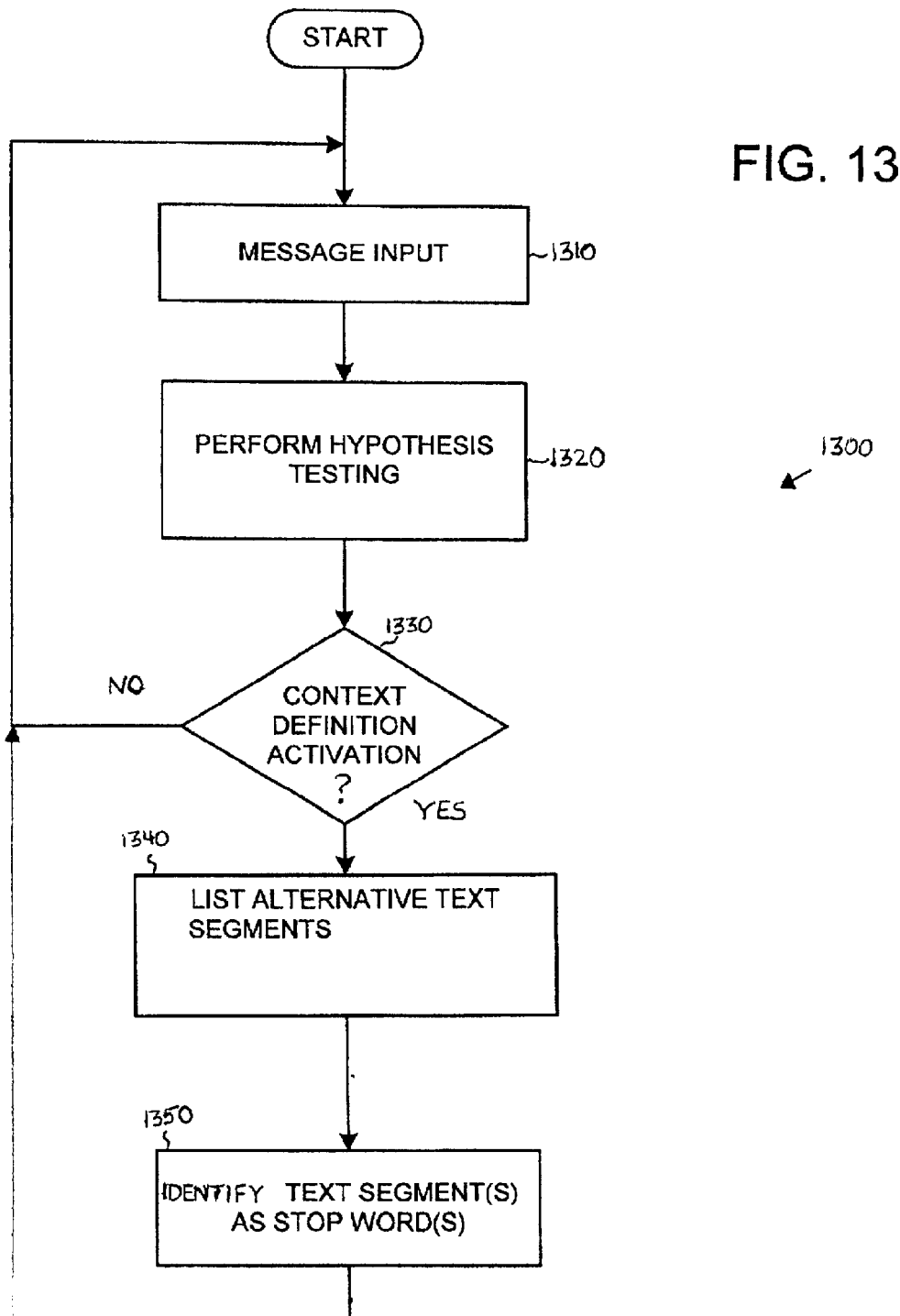
FIG. 13 is a flow diagram of a method for adapting a semantic model by user identification of context according to various aspects of the present invention.

An exemplary method 1300 for user identification of stop segments during message recognition may be better understood with reference to FIG. 13. Method 1300 begins at step 1310 with a segment of message input provided by a user. Such a segment may include, for example, a sentence dictated by the user with voice input or a handwritten phrase conveyed by the user with freehand input.

At step 1320, a message recognizer (e.g., speech recognizer 162, message recognizer 310) performs hypothesis testing to identify text segments that each receive a high score in accordance with a message model. The text segment receiving the highest score (i.e., the maximum likelihood text segment) is conventionally provided as the message recognizer's "best guess" of the text data corresponding to the message input. Text segments receiving high scores (e.g., in the top 10) but not the highest are considered alternative text segments.

Although method 1300 is for the preparation of a semantic model according to various aspects of the present invention, the hypothesis testing of step 1320 may be performed in accordance with only a syntactic model. No semantic model may be used at step 1320 in certain situations, for example at the beginning of a message recognition session when the semantic model may not be considered ready for use.

At decision step 1330, a determination is made as to whether context definition is to be activated. If no context definition is initiated automatically or manually, message recognition proceeds at step 1310. If context definition is to be initiated, a context definition mode is entered for user identification of one or more stop segments.

In method 1300, a context definition mode is activated at step 1340. At step 1340, alternative text segments are listed for possible identification as stop segments by the user. At step 1350, text segments (if any) considered to be outside the present or user context are identified as stop segments.

A user may initiate a context definition mode manually. The context definition mode may be initiated when the user initiates a correction mode to correct a misrecognition by the message recognizer. Alternatively, a user may communicate an appropriate editing command to indicate, without initiating a correction process, that a text segment provided by a message recognizer is out of either the present context or the user context. With an editing command from the set provided in TABLE II above, for example, the user may indicate that a displayed text segment is out of the present context by using a stylus to draw a straight horizontal line through the text segment, then immediately double-tapping the stylus (i.e., tapping the stylus twice, rapidly) somewhere on the text segment. The user may indicate that the text segment is out of the user context by using a stylus to draw a straight horizontal line through the segment, followed immediately by another straight horizontal line back through the segment, then immediately double-tapping the stylus somewhere on the segment.

A message recognizer may also have the ability to initiate a context definition mode automatically. A context definition mode may be automatically initiated when the message recognizer determines that one or more alternative text segments (e.g., text segments receiving a high score during hypothesis testing) may be expected to be especially useful for indicating context as stop segments. A text segment may be expected to be especially useful for indicating context when it has a relatively high probability of global cluster occurrence and a relatively low probability of shared cluster occurrence with text segments in a document being generated (e.g., other alternative text segments or the "best guess" of the message recognizer).

A context definition mode that is initiated automatically can present the user with a list of alternative text segments in addition to the message recognizer's "best guess." Alternatively, the user may be presented with a simple question that may be quickly answered. For example, if the user dictates the sentence "Can you recognize speech?", the message recognizer may determine that the word BEACH could be especially useful for indicating context as a stop segment. If the message recognizer is configured to initiate a context definition mode automatically, the user might be presented with a dialog box containing the statement "You dictated the phrase RECOGNIZE SPEECH. Is the word BEACH of context?" and three "radio buttons" labeled "No," "Yes, this time," and "Always." If the word BEACH is not out of context, the user could select (or say) "No." If the word BEACH is outside the present context, the user could select or say "Yes, this time." If the word BEACH is outside the user context, the user could select or say "Always."

For optimal configuration of a message recognizer to automatically initiate a context definition mode, a number of factors should be considered and weighed. Text segments that rarely occur in any context (i.e., low probability of global cluster occurrence) are less useful as stop segments because they can be expected to have a high probability of shared cluster occurrence with only a limited number of other text segments. However, text segments that occur in very many contexts (i.e., very high probability of global cluster occurrence) are of limited usefulness as stop segments because they could be expected to cause negative bias to many alternative text segments, in some cases a majority. Text segments that occur frequently in many contexts (ie., high probability of shared cluster occurrence with many text segments) are also of limited usefulness as stop segments because they can be expected to cause significant negative bias with only a limited number of other text segments. Text segments that have been generated previously in a document (or by a user) may be excluded from consideration as stop segments, since it may be presumed that the user has previously considered such text segments to be in the present (or user) context.

A message recognizer may initiate a context definition mode at the beginning of a message recognition session. For example, a list of text segments that are known to be especially useful as stop segments may be presented to a user. With a conventional dialog user interface, the user may check boxes appropriately labeled (e.g., "User" and "Present") next to listed text segments to identify them as stop segments being outside of the user or present context, respectively. Several lists may be presented interactively to the user to refine the definition of context as user input is processed. For example, if the user identifies the word UNCLE in a first list as being outside the present context (because it relates to familial relationships), a second list of possible stop segments may include the word FRIEND to determine whether the present context excludes discussions of all interpersonal relationships.

Identification of semantic clusters (e.g., by method 1000) may be performed as a nonrecurring software engineering process. Identification of stop segments (e.g., by method 1300) is typically performed as a user interaction process. After identification of semantic clusters and one or more stop segments, a message recognizer may operate in accordance with a semantic model according to various aspects of the present invention.

As discussed above, a semantic model according to various aspects of the present invention biases against those tested segments that have a high probability of occurrence in clusters considered to be outside the present context. Such a model applies a negative bias against those text segments having a high probability of shared cluster occurrence with one or more stop segments identified by a user.

Negative bias may be applied by any suitable technique or combination of techniques. Examples of techniques for biasing against a tested text segment include: providing one or more suitable mathematical terms in one or more model equations to reduce the hypothesis score of the text segment; subtracting a computed value from the hypothesis score of the text segment; multiplying the hypothesis score of the text segment by a computed value (e.g., a fractional coefficient); and selecting only text segments for further consideration, from within a range of hypothesis scores, that have not received a bias.

The negative biasing in the model may be proportional to the probability of shared cluster occurrence between each tested text segment and the identified stop segment(s). With proportional biasing, the adapted model applies a more negative bias against text segments that can be expected to appear frequently in semantic clusters together with a stop segment. In a variation, the negative biasing may also be inversely proportional to the probability of global cluster occurrence of each tested text segment. The semantic model then does not apply as negative a bias against a text segment that can be expected to appear in many semantic clusters as it would against a text segment that can be expected to appear in only a few semantic clusters, all other factors being equal.

The first exemplary semantic model is a modification of the semantic model disclosed in U.S. Pat. No. 5,828,999 to Bellegarda, incorporated by reference above. The "mixture language model" disclosed in the '999 patent expresses probability of a word (i.e., text segment) as the sum of products between (1) probability of the word, given each semantic cluster in the summation, and (2) probability of each respective semantic cluster, given a contextual history. The first exemplary semantic model, according to the present invention, departs from the model of the '999 patent by expressing probability of a text segment as the sum of ratios between (1) probability of the text segment, given each semantic cluster in the summation, and (2) the combined probability of stop words sharing each semantic cluster.

The approach taken in the '999 patent is to determine probability of a tested text segment as a positive function of its probability of occurrence in a history of prior words. The inventive approach, generally speaking, is to determine probability of the tested text segment as a negative function of its probability of occurrence with user identified stop segments. The former approach calls for the message recognition system to guide itself toward a relevant context by looking backward to a history of prior words. The latter approach, generally speaking, asks the user to guide the message recognition system away from irrelevant contexts by looking forward to his or her goals for a particular document (present context) and as a writer (user context). In variations, it may be desirable for both approaches to be used in a combined language model, or combined in one semantic model.

The first exemplary semantic model, adapted with M stop segments, may be implemented mathematically, using the following equation:

$$Pr(w_i) = \sum_{k=1}^{M} \left[ \frac{Pr(w_i \mid C_k)}{A + \sum_{j=1}^{L} B_j \, Pr(s_j \mid C_k)} \right]$$

During message recognition in accordance with the first exemplary semantic model, when implemented by the equation above, a ratio is computed for each semantic cluster $C_1 \ldots C_M$ in the model. The probability of the tested text segment $w_i$ occurring in each semantic cluster is divided by the combined probability of user identified stop segments $s_1 \ldots s_L$ occurring in the same semantic cluster. The combined probability may be computed in any suitable fashion. In the equation above, the individual probabilities of each stop segment $s_j$ occurring in a given semantic cluster $C_k$ are simply summed together. Although such a summation could result in a combined probability greater than 1.00, the combined probability permits multiple stop segments to contribute to an overall negative bias.

In a variation of the first exemplary semantic model, the combined probability may be computed as the inverse of the product of negative probabilities. (A negative probability in this example is considered the probability of a stop segment not occurring in a given semantic cluster.) In this variation, a high probability of any one stop segment occurring in a given semantic cluster will cause one low negative probability to be included in the product. Consequently, the inverse of the product, which in this variation is the combined probability, will be relatively high. The ratio computed in the first exemplary semantic model will thus be relatively low, effecting a negative bias based on the high probability of a single stop segment occurring in a given semantic cluster with the tested text segment.

The negative bias incurred by identified stop segments may be tempered in the second exemplary semantic model by the inclusion of suitable mathematical terms. In the equation above, for example, a constant term A is included in the denominator of the ratio to limit the effect of the combined probability. The value of the constant term A may be selected in accordance with design or user preference.

The second exemplary semantic model, according to the present invention, expresses probability of a tested text segment as the product of negative biasing terms. A negative biasing term in this example is any term that varies between zero and one based on probability of shared cluster occurrence between the tested text segment and a stop segment. The closer such a negative biasing term is to zero, the more it will reduce the product of biasing terms, and the more negative a bias it will cause in the second exemplary semantic model. In the second exemplary semantic model, the product may include one negative biasing term for each identified stop segment.

The second exemplary semantic model, adapted with M stop segments, may be implemented mathematically, using the following equation:

$$Pr(w_i) = \prod_{j=1}^{M} \left[ 1 - \frac{B_j Pr(w_i s_j \mid V)}{Pr(w_i \mid V)} \right]$$

In the equation above, each negative biasing term is computed as the ratio between (1) the probability of shared cluster occurrence $Pr(w_i s_j \mid V)$ between the tested text segment $w_i$ and a stop segment $s_j$, and (2) the probability of global cluster occurrence $Pr(w_i \mid V)$ of the tested text segment $w_i$.

During message recognition in accordance with the second exemplary semantic model, when implemented by the equation above, a high probability of any one stop segment occurring in the same semantic cluster as the tested text segment will cause one small negative biasing term to be included in the product. Consequently, the probability (here, the score) assigned to the tested text segment during hypothesis testing will be relatively low, effecting a negative bias based on the high probability of a single stop segment occurring in the same semantic cluster as the tested text segment.

In a semantic model according to various aspects of the present invention, the severity of negative bias effected by a particular stop segment may be varied depending on one or more factors. For example, a stop segment that has been identified as being outside a present context may be "downgraded with age" with the passage of time following the identification. As another example, the severity of negative bias may be downgraded (i.e., less negative bias) with the generation of additional text following the identification. In the exemplary equation above, a bias limiting coefficient $B_j$ is included to limit the negative effect of each biasing term, as desired.

A semantic model may be combined with a syntactic model using any conventional technique. Suitable combination techniques may include maximum entropy, backoff, linear interpolation, and linear combination. By way of example, a maximum entropy language model integrating N-gram (i.e., syntactic) and topic dependencies is disclosed in a paper entitled "A Maximum Entropy Language Model Integrating N-Grams And Topic Dependencies For Conversational Speech Recognition," by Sanjeev Khudanpur and Jun Wu (Proceedings of ICASSP '99), incorporated herein by reference. By way of a further example., combination of models by linear interpolation and, alternatively, by backoff is disclosed in a paper entitled "A Class-Based Language Model For Large-Vocabulary Speech Recognition Extracted From Part-Of-Speech Statistics" by Christer Samuelsson and Wolfgang Reichl (Proceedings of ICASSP '99), incorporated herein by reference.

In a variation, a semantic model may be integrated with a syntactic model in a single, hybrid language model of the type disclosed in U.S. Pat. No. 5,839,106 to Bellegarda, incorporated by reference above.

In a further variation, the second exemplary semantic model may be combined with a conventional syntactic model by treating the semantic model as a negative biasing factor to the syntactic model. In the combination, the semantic model may be appropriately limited such that even a text segment that is a stop word may be selected as the message recognizer's "best guess" if the segment is a very strong fit in the syntactic model. Such a combination may be implemented mathematically, using the equation below. In the equation, the left-hand product term $Pr(w_i|LM_{syn})$ is the probability assigned to the tested text segment by the conventional syntactic model.

$$Pr(w_i) = Pr(w_i \mid LM_{syn}) \prod_{j=1}^{M} \left[1 - \frac{B_j Pr(w_i s_j \mid V)}{Pr(w_i \mid V)}\right]$$

Figure 4:
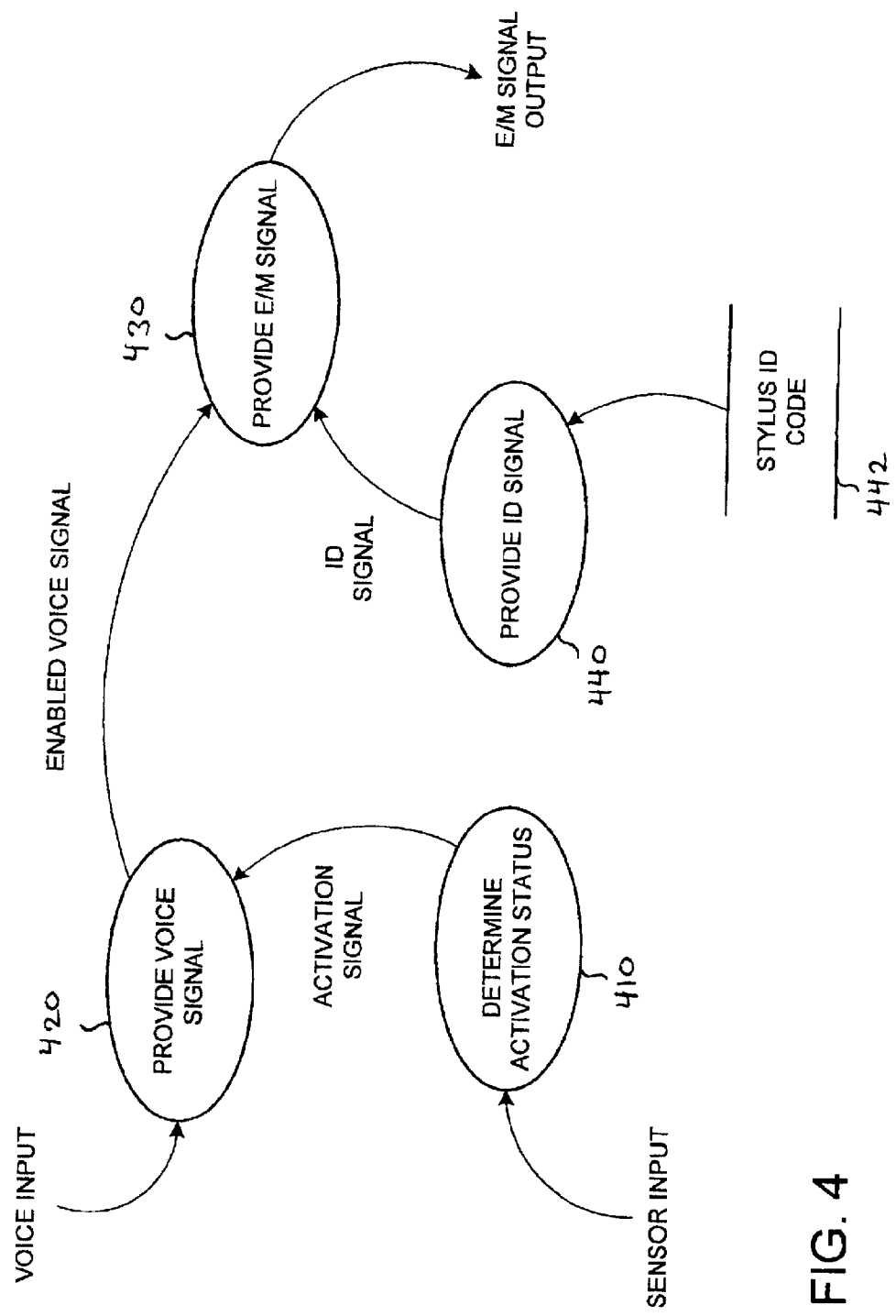
FIG. 4 is a data flow diagram of the operation of a stylus according to various aspects of the present invention.

An example of the operation of system 200 may be better understood with reference to the data flow diagrams of FIGS. 4 and 5. Exemplary processes, described below with reference to these data flow diagrams, may be variously implemented with and without user intervention, in hardware and/or software. The example provided below illustrates the benefits of various aspects of the present invention when these aspects are employed in an exemplary embodiment and operation example. However, benefits of certain aspects may be obtained even when various other aspects are omitted. Thus, the example below should not be considered as limiting the scope of the invention in any way.

The operation of stylus 210, in the example, may be better understood with reference to the data flow diagram of FIG. 4. Process 410 determines activation status of stylus 210. When user 242 moves stylus 210 toward his or her head to begin dictation, process 410 positively asserts an activation signal to process 420. Process 420 provides a voice signal responsive to voice input from user 242. Process 420 provides an enabled voice signal to process 430 upon two conditions. The first condition is that the activation signal from process 410 has been positively asserted to indicate that stylus 210 is situated to receive voice input from user 242. The second condition is that user 242 has provided voice input by speaking into the microphone of stylus 210.

Process 440 provides an identification signal based on a 48-bit stylus identification code 442. (A longer code may be used when the identification signal is employed for decryption.) Process 430 responds to the identification signal and to the enabled voice signal from process 420 to provide an electromagnetic signal. The electromagnetic signal suitably combines the identification signal and the voice signal. The electromagnetic signal is transmitted from stylus 210 to domain controller 220 (communications link 235).

The operation of domain controller 220, in the example, may be better understood with reference to the data flow diagram of FIG. 5. Process 510 extracts signal components from the electromagnetic signal provided by process 430. The identification signal identifies the source of the electromagnetic signal as stylus 210 and, consequently, the source of the voice signal as user 242.

Process 520 initializes local message model 316 in domain controller 220 to be in conformance with user message model 262. (Process 520 may employ any appropriate network protocol to transfer digital indicia of user message model 262.) Not shown in FIG. 5 is a process for initializing user message model 262 to be in conformance with local message model 316 after adaptation of local message model 316.

Process 530 performs speech recognition in accordance with initialized message model 316 to generate text data responsive to the voice signal. Process 540 performs handwriting recognition, also in accordance with initialized message model 316, to generate text data responsive to freehand input from user 242. Process 540 further interprets editing commands from user 242 responsive to freehand input. User 242 conveys freehand input by manipulating stylus 210 on a tablet surface (not specifically shown) of tablet 252.

Process 550 edits text generated by process 530 and process 540 responsive to editing commands interpreted by process 540. Editing may include user modification of text that has been correctly generated by processes 530 and 540, but which the user desires to modify. Editing may further include user training, conveyed by freehand input, voice input, and/or character input. User training may include correction of misrecognition by processes 530 and 540, which is conveyed back to processes 530 and 544 for adaptation of local message model 316. Correction conveyed back to either process adapts local message model 316. Process 550 provides text output for display on tablet 252.

The processes illustrated in the data flow diagrams of FIGS. 4 and 5 continue as user 242 continues providing voice and/or freehand input for generation and editing of text data.

Multiple displays, for example integrated with tablet surfaces of tablets, may be advantageously used to display multiple views of a single document in accordance with various aspects of the present invention. A first view of the document may be provided on a first display (e.g., of a first tablet), while a second view of the document may be provided on a second display (e.g., of a second tablet). Upon modification of the document, the first and second views are modified as needed to reflect the modification to the document.

When first and second tablets are networked together, modification made to the document by user input to the first tablet is communicated to the second tablet to modify the second view as needed to reflect the modification. Similarly, modification made to the document by user input to the second tablet is communicated to the first tablet to modify the first view as needed to reflect the modification.

Figure 15B:
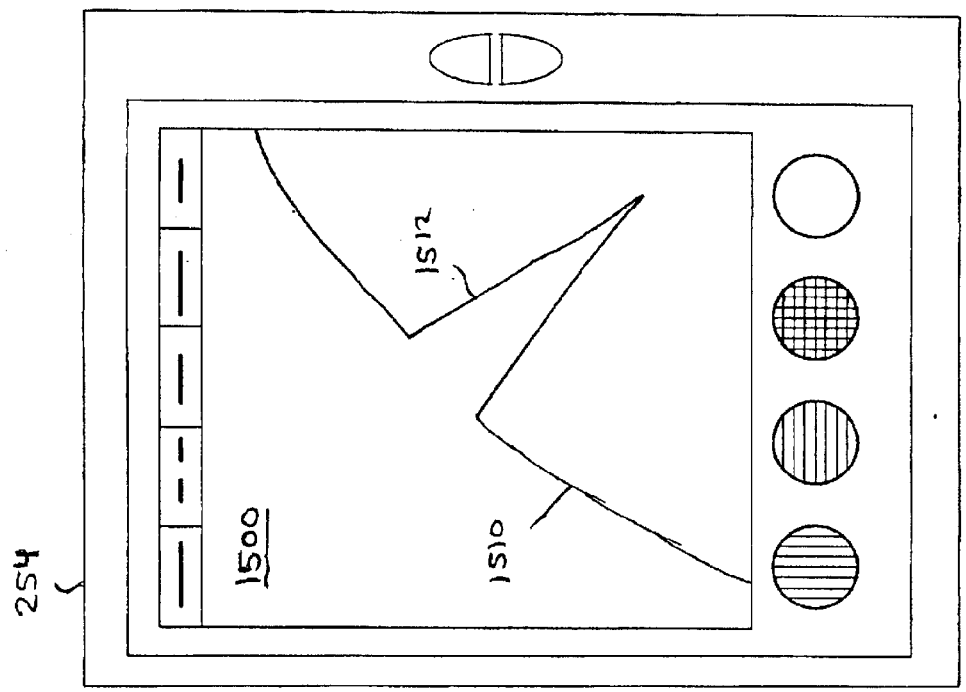
FIGS. 15A and 15B are planar views of respective tablets displaying respective views of a document according to various aspects of the present invention.
Figure 15A:
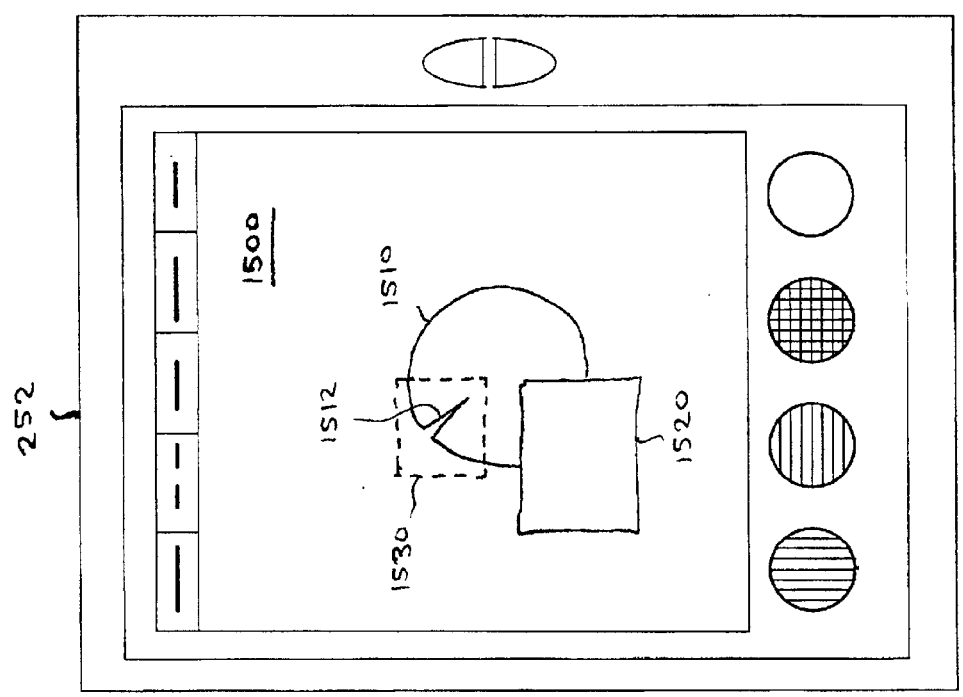

An example of the use of multiple displays to provide multiple views of a single document may be better understood with reference to FIG. 15 (including FIGS. 15A and 15B). Tablet 252 is illustrated in FIG. 15A as displaying a first view of a graphical document 1500. The first view shows a circle 1510 and a rectangle 1520. A portion of the circle having a cutout 1512 is enclosed by a bounding box 1530.

Tablet 254 is illustrated in FIG. 15B as displaying a second view of document 1500. The second view shows a different portion of document 1500, namely the portion inside bounding box 1530. Cutout 1512 takes up most of the display of tablet 254.

Advantageously, modifications made to a portion of document 1500 inside bounding box 1530 (e.g., filling in of notch 1512) are displayed on both tablet 252 and tablet 254. The first view of document 1500, displayed on tablet 252, is updated according to various aspects of the invention to reflect modification made by user input to tablet 254. Modifications to the document may be centrally registered in a single data store, for example in domain controller 220. Alternatively, each tablet displaying a view of the document may update a complete copy of the document in a data store local to the tablet.

While the present invention has been described in terms of preferred embodiments and generally associated methods, it is contemplated that alterations and permutations thereof will become apparent to those skilled in the art upon a reading of the specification and study of the drawings. The present invention is not intended to be defined by the above description of preferred exemplary embodiments, nor by any of the material incorporated herein by reference. Rather, the present invention is defined variously by the issued claims. Each variation of the present invention is intended to be limited only by the recited limitations of its respective claim, and equivalents thereof, without limitation by terms not present therein.

What is claimed is:

1. A system for generating text responsive to message input of a first type and a second type, the system comprising:
   (a) a unified message model including:
      (1) a shared language model;
      (2) a first model specific to a first type of message recognition; and
      (3) a second model specific to a second type of message recognition;
   (b) a first message recognizer, responsive to the first type of message input to provide text data in accordance with both the shared language model and the first model; and
   (c) a second message recognizer, responsive to the second type of message input to provide text data in accordance with both the shared language model and the second model; wherein
   (d) the shared language model is trainable responsive to user correction of misrecognition by either of the first and second message recognizers, thereby improving accuracy of each of the first and second message recognizers.

2. The system of claim 1 wherein:
   (a) the first type of message recognition is speech recognition, the first type of message input is voice input, and the first model is an acoustic model; and
   (b) the second type of message recognition is handwriting recognition, the second type of message input is freehand input, and the second model is a handwriting model.

3. The system of claim 2 further comprising a stylus, wherein the shared language model is trainable responsive to user correction of misrecognition by the first message recognizer by (a) movement of the stylus across visual indicia of dictated text that has been erroneously generated to specify a selection from the text, and (b) correction of the selection.

4. The system of claim 3 wherein:
   (a) the stylus includes a pointing interface and a microphone;
   (b) the system further comprises a tablet responsive to the pointing interface;
   (c) the voice input is from the microphone; and
   (d) the freehand input is from the pointing interface being manually manipulated on the tablet.

5. The system of claim 4 wherein the visual indicia of dictated text appears on the tablet.

6. The system of claim 1 wherein the shared language model comprises a syntactic model and a semantic model.

7. A method for performing message recognition with a shared language model, the method comprising:
   (a) performing message recognition of a first type, responsive to a first type of message input, to provide text data in accordance with both the shared language model and a first model specific to the first type of message recognition;
   (b) performing message recognition of a second type, responsive to a second type of message input, to provide text data in accordance with both the shared language model and a second model specific to the second type of message recognition; and
   (c) training the shared language model responsive to user correction of error in message recognition of either of the first and second types, thereby improving accuracy of each of the first arid second types of message recognition.

8. The method of claim 7 wherein:
   (a) performing the first type of message recognition comprises performing speech recognition responsive to voice input in accordance with the shared language model and a first model that is an acoustic model; and
   (b) performing the second type of message recognition comprises performing handwriting recognition responsive to freehand input in accordance with the shared language model and a second model that is a handwriting model.

9. The method of claim 8 wherein training the shared language model includes (a) moving a stylus across visual indicia of dictated text that has been erroneously generated to specify a selection from the text, and (b) correcting the selection.

10. The method of claim 9 wherein:
    (a) performing speech recognition responsive to voice input includes responding to voice input from a microphone in the stylus; and
    (b) performing handwriting recognition responsive to freehand input includes responding to manual manipulation of the stylus on a tablet.

11. The method of claim 10 wherein the visual indicia of dictated text appears on the tablet.

12. The method of claim 7 wherein performing message recognition in accordance with the shared language model comprises performing message recognition in accordance with a syntactic model and a semantic model.

13. A system for performing message recognition with a trainable shared language model, the system comprising:
    (a) means for performing message recognition of a first type, responsive to a first type of message input, to provide text data in accordance with both the shared language model and a first model specific to the first type of message recognition; and
    (b) means for performing message recognition of a second type, responsive to a second type of message input, to provide text data in accordance with both the shared language model and a second model specific to the second type of message recognition.

14. The system of claim 13 wherein:
    (a) the first type of message recognition is speech recognition, the first type of message input is voice input, and the first model is an acoustic model; and (b) the second type of message recognition is handwriting recognition, the second type of message input is freehand input,. and the second model is a handwriting model.

15. The system of claim 13 wherein the shared language model comprises a syntactic model and a semantic model.

16. The system of claim 13 further comprising means for training the shared language model responsive to user correction of error in message recognition of either of the first and second types, thereby improving accuracy of each of the first and second types of message recognition.

17. The system of claim 16 wherein the means for training the shared language model includes means for (a) specifying a selection from visual indicia of dictated text that has been erroneously generated, and (b) correcting the selection.

* * * * *